United States Patent
Kishiyama et al.

(10) Patent No.: US 10,349,399 B2
(45) Date of Patent: Jul. 9, 2019

(54) USER DEVICE AND BASE STATION

(71) Applicant: NTT DOCOMO, INC., Tokyo (JP)

(72) Inventors: Yoshihisa Kishiyama, Tokyo (JP); Daisuke Kurita, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/559,678

(22) PCT Filed: Mar. 15, 2016

(86) PCT No.: PCT/JP2016/058165
§ 371 (c)(1),
(2) Date: Sep. 19, 2017

(87) PCT Pub. No.: WO2016/152655
PCT Pub. Date: Sep. 29, 2016

(65) Prior Publication Data
US 2018/0288753 A1 Oct. 4, 2018

(30) Foreign Application Priority Data

Mar. 20, 2015 (JP) .................................. 2015-058738

(51) Int. Cl.
*H04W 16/28* (2009.01)
*H04W 56/00* (2009.01)
*H04W 72/04* (2009.01)

(52) U.S. Cl.
CPC ......... *H04W 72/044* (2013.01); *H04W 16/28* (2013.01); *H04W 56/00* (2013.01);
(Continued)

(58) Field of Classification Search
CPC .... H04B 7/2656; H04W 16/12; H04W 16/26; H04W 72/0446
See application file for complete search history.

(56) References Cited

U.S. PATENT DOCUMENTS 9,326,258 B2    4/2016  Takaoka et al.
2013/0301619 A1  11/2013  Singh et al.
(Continued)

FOREIGN PATENT DOCUMENTS

JP    2011-040832 A    2/2011
JP    2013-219507 A   10/2013
(Continued)

OTHER PUBLICATIONS

International Search Report issued in PCT/JP2016/058165 dated Jun. 7, 2016 (2 pages).
(Continued)

*Primary Examiner* — Chandrahas B Patel
(74) *Attorney, Agent, or Firm* — Osha Liang LLP

(57) ABSTRACT

A user device communicates with base stations in a radio communication system including the base stations. The user device includes a receiver that receives a first downlink control signal transmitted from one of the base stations, a transmitter that transmits uplink signals using multiple antenna ports or multiple beams, and a controller that controls, for each subframe, transmission timing of the uplink signals transmitted using the multiple antenna ports or the multiple beams, based on the first downlink control signal.

11 Claims, 25 Drawing Sheets

(52) U.S. Cl.
CPC ......... *H04W 56/001* (2013.01); *H04W 72/04* (2013.01); *H04W 72/0406* (2013.01)

(56) References Cited

U.S. PATENT DOCUMENTS

2014/0148186 A1* 5/2014 Zhou ................. H04W 56/0005
455/452.1
2014/0321406 A1 10/2014 Marinier et al.

FOREIGN PATENT DOCUMENTS

| | | |
|---|---|---|
| JP | 2013-247643 A | 12/2013 |
| JP | 2014-030101 A | 2/2014 |
| JP | 2014-204216 A | 10/2014 |
| JP | 2014-532355 A | 12/2014 |
| JP | 2014-533036 A | 12/2014 |
| WO | 2012/093455 A1 | 7/2012 |
| WO | 2013/066412 A1 | 5/2013 |

OTHER PUBLICATIONS

Written Opinion of the International Searching Authority issued in PCT/JP2016/058165 dated Jun. 7, 2016 (5 pages).
Supplementary Partial European Search Report issued in EP 16768558.5 dated Nov. 7, 2018 (15 pages).
ETSI TS 136 213 V11.5.0; "LTE; Evolved Universal Terrestrial Radio Access (E-UTRA); Physical layer procedures (3GPP TS 36.213 version 11.5.0 Release 11)"; Jan. 2014; (184 pages).
Extended European Search Report issued in the counterpart European Patent Application No. 16768558.5, dated Feb. 19, 2019 (12 pages).

* cited by examiner

FIG.11

| UPLINK BEAM IDENTIFIER | TRANSMISSION TIMING INFORMATION | RESOURCE ALLOCATION INFORMATION |
|---|---|---|

FIG.19

| SITE IDENTIFIER | RESOURCE ALLOCATION INFORMATION |
|---|---|

FIG.24

```
RESOURCE
ALLOCATION
INFORMATION
```

USER DEVICE AND BASE STATION

TECHNICAL FIELD

The present invention relates to a user device and a base station.

BACKGROUND ART

Long Term Evolution (LTE)/LTE-Advanced employs MIMO technologies to increase, for example, the system capacity and the cell edge user throughput. Also, Long Term Evolution (LTE)/LTE-Advanced employs heterogeneous network technologies that make it possible to mix different types of base stations (e.g., macro cells and small cells) while reducing the inter-cell interference and achieving high-quality communications.

Particularly, it is expected to use high-frequency bands for small cells in a heterogeneous network. Here, because propagation loss increases in a high-frequency band, it is being considered to compensate for the propagation loss by using massive MIMO where beams with narrow beam widths are formed.

The massive MIMO is a large-scale MIMO system where a large number of antennas (e.g., 100 elements) are used. The massive MIMO makes it possible to concentrate the electric-field intensity in a narrow area and thereby makes it possible to reduce the interference between users.

Also, for a heterogeneous network, it is being considered to perform beam forming using multiple antennas both for uplink and downlink to compensate for propagation loss in a high-frequency band.

RELATED-ART DOCUMENT

[Patent Document]
[Patent Document 1] Japanese Laid-Open Patent Publication No. 2013-219507

DISCLOSURE OF INVENTION

Problems to be Solved by the Invention

For a heterogeneous network, it is being considered to enable a user device (UE) to simultaneously communicate with multiple base stations forming small cells to increase the communication capacity and to achieve a diversity gain that in turn improves the throughput.

However, the current LTE/LTE-Advanced standards do not provide technologies for transmitting and receiving various signals (e.g., control signals and user data) between multiple base stations and a user device in a case where beam forming is performed both for downlink and uplink. Thus, related-art technologies do not enable efficient communication between multiple base stations and a user device in a case where beam forming is employed both for downlink and uplink.

One object of this disclosure is to solve or reduce the above-described problems, and to provide a technology that enables efficient communication in a radio communication system including a user device and base stations that perform beam forming.

Means for Solving the Problems

In an aspect of this disclosure, there is provided a user device that communicates with base stations in a radio communication system including the base stations. The user device includes a receiver that receives a first downlink control signal transmitted from one of the base stations, a transmitter that transmits uplink signals using multiple antenna ports or multiple beams, and a controller that controls, for each subframe, transmission timing of the uplink signals transmitted using the multiple antenna ports or the multiple beams, based on the first downlink control signal.

Another aspect of this disclosure provides a base station that communicates with a user device in a mobile communication system including the base station, another base station, and the user device. The base station includes a receiver that receives an uplink signal transmitted from the user device, and a transmitter that transmits, for each subframe, a control signal including information reporting transmission timing of the uplink signal to the user device. The transmission timing is calculated based on the uplink signal or obtained from the another base station. Another aspect of this disclosure provides a user device that communicates with a first base station and a second base station in a radio communication system including the first base station and the second base station. The user device includes a receiver that receives a first downlink signal transmitted from the first base station and a second downlink signal transmitted from the second base station, and a synchronizer that controls the receiver to synchronize with the first downlink signal and the second downlink signal at different reception timings in each subframe.

Another aspect of this disclosure provides a user device that communicates with a first base station and a second base station in a radio communication system including the first base station and the second base station. The user device includes a receiver that receives a first downlink signal transmitted from the first base station and a second downlink signal transmitted from the second base station, and a transmitter that transmits signals for requesting the first base station and the second base station to change transmission timing so that the reception timing of the first downlink signal and the reception timing of the second downlink signal synchronize with each other.

Advantageous Effect of the Invention

An aspect of this disclosure provides a technology that enables efficient communication in a radio communication system including a user device and base stations that perform beam forming.

BRIEF DESCRIPTION OF THE DRAWINGS

FIG. 11 is a drawing illustrating an exemplary format of a control signal used in the uplink signal transmission process (2);

FIG. 19 is a drawing illustrating an exemplary format of a control signal used in the downlink signal transmission process (1);

FIG. 24 is a drawing illustrating an exemplary format of a control signal used in the downlink signal transmission process (3)

DESCRIPTION OF EMBODIMENTS

Embodiments of the present invention are described below with reference to the accompanying drawings. Embodiments described below are examples, and the present invention is not limited to those embodiments. For example, although it is assumed in the embodiments that a radio communication system conforms to LTE, OFDMA is employed for downlink, and SC-FDMA is employed for uplink, the present invention is not limited to those embodiments. For example, OFDMA may be employed for both uplink and downlink, and other communication schemes may also be used. Also, the present invention may be applied to communication schemes other than LTE. In the specification and the claims of the present application, "LTE" is used in a broad sense and may indicate not only a communication scheme corresponding to 3GPP release 8 or 9, but also a communication scheme corresponding to 3GPP release 10, 11, 12, 13, 14, or later.

<Outline>
<Overall Configuration of Radio Communication System>

Figure 1:
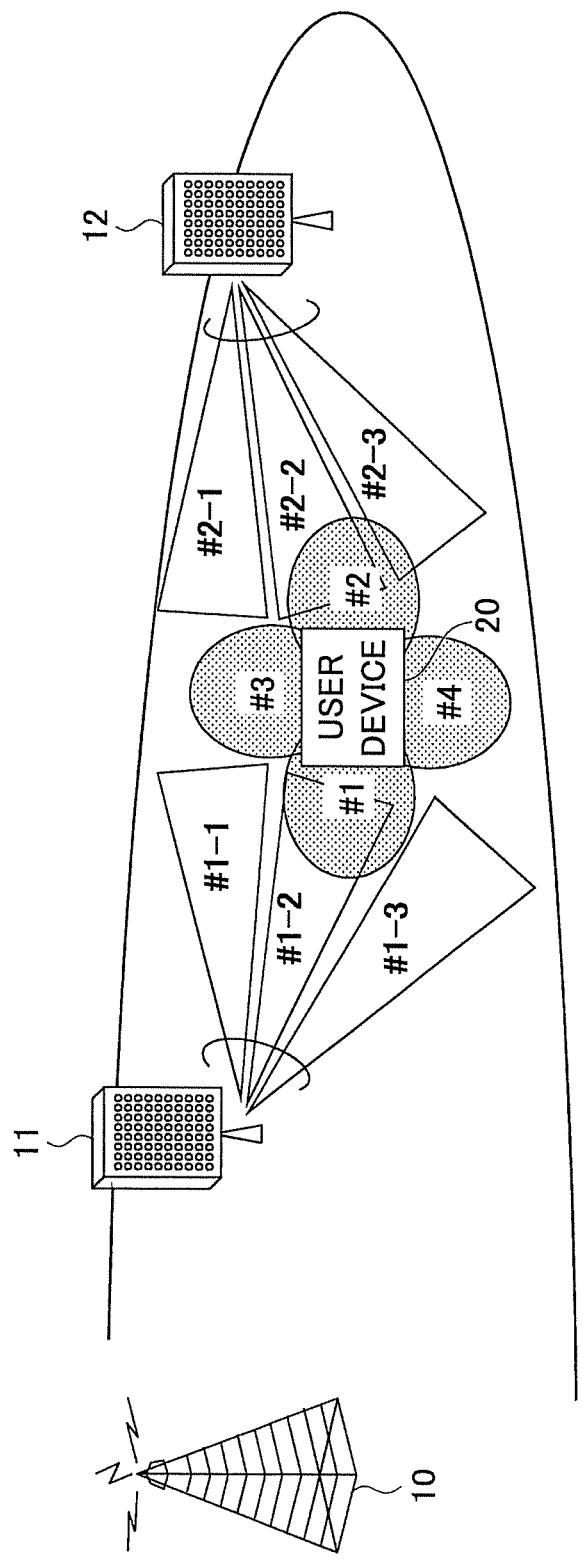
FIG. 1 is a drawing illustrating an overall configuration of a radio communication system according to an embodiment.

FIG. 1 is a drawing illustrating an overall configuration of a radio communication system according to an embodiment. The radio communication system of the present embodiment includes a macro base station 10 forming a macro cell, and small base stations 11 and 12 located within the coverage area of the macro cell. FIG. 1 also includes a user device 20 that communicates with the macro base station 10 and the small base stations 11 and 12.

In the radio communication system, macro coverage is achieved by the macro base station 10 using a low-frequency band, and traffic in small areas (e.g., hot spots) is handled by the small base stations 11 and 12 using high-frequency bands. However, the allocation of frequency bands is just an example, and the present invention is not limited to this example.

The macro base station 10 and the small base stations 11 and 12 wirelessly communicate with the user device 20. Each of the macro base station 10 and the small base stations 11 and 12 is comprised of hardware resources including a CPU such as a processor; a memory such as a ROM, a RAM, or a flash memory; an antenna(s) for communicating with, for example, the user device 20, and a communication interface for communicating with, for example, neighboring base stations and a core network. Functions and processes of the macro base station 10 and the small base stations 11 and 12 may be implemented by processing and executing data and programs stored in a memory by a processor. However, the hardware configuration of the macro base station 10 and the small base stations 11 and 12 is not limited to that described above, and the macro base station 10 and the small base stations 11 and 12 may have any other appropriate hardware configuration.

The user device 20 includes a function to wirelessly communicate with, for example, the macro base station 20, the small base stations 11 and 12, and a core network. The user device 20 is, for example, a cellphone, a smartphone, a tablet computer, a mobile router, or a wearable terminal. The user device 20 may also be a communication device provided in a public transportation vehicle such as a train, or a device including the function of a relay in the backhaul of inter-base-station communications. The user device 20 may be implemented by any device including a communication function. The user device 20 is comprised of hardware resources including a CPU such as a processor; a memory such as a ROM, a RAM, or a flash memory; an antenna(s) for communicating with the macro base station 10 and the small base stations 11 and 12, and a radio frequency (RF) device. Functions and processes of the user device 20 may be implemented by processing and executing data and programs stored in a memory by a processor. However, the hardware configuration of the user device 20 is not limited to that described above, and the user device 20 may have any other appropriate hardware configuration.

Each of the small base stations 11 and 12 of the present embodiment includes a massive MIMO function, and can form various beams including a wide beam and a narrow beam. In the present embodiment, multiple pre-coded signals are transmitted from the small base stations 11 and 12 by using the corresponding beams (multiple antenna ports). Pre-coded signals indicate, in the example of transmission signals, that the transmission signals are multiplied by weights corresponding to antenna ports so that the transmission signals are transmitted using beams with given widths. In the example of FIG. 1, the small base station 11 transmits signals using a beam #1-1, a beam #1-2, and a beam #1-3. Also, the small base station 12 transmits signals using a beam #2-1, a beam #2-2, and a beam #2-3.

The macro base station 10 of the present embodiment is connected via, for example, optical fiber lines to the small base stations 11 and 12, and centrally controls radio resources for small cells formed by the small base stations 11 and 12. Although the configuration of FIG. 1 includes the macro base station 10, the macro base station 10 may be omitted. In such a case, one of the small base stations 11 and 12 centrally controls radio resources for the small cells formed by the small base stations 11 and 12.

The user device 20 of the present embodiment includes multiple antennas and includes a function to perform uplink MIMO transmission. That is, the user device 20 can perform uplink beam forming and multi-rank transmission. In the present embodiment, multiple pre-coded signals are transmitted from the user device 20 using the corresponding beams (multiple antenna ports). In the example of FIG. 1, the user device 20 transmits signals using a beam #1, a beam #2, a beam #3, and a beam #4. Here, even in the feature, a user device including one antenna may also be used as the user device 20 depending on its purpose. An example of such a user device is a low-cost MTC terminal. Also, it is expected that a user device with a MIMO transmission function using, for example, four antennas becomes the mainstream. Further, depending on the purpose, a user device including a massive MIMO function using 16 or more antennas may also be used.

<Outline of Communication Method>

In the radio communication system of the present embodiment, the user device 20 performs communications by using two beams with good communication quality out of multiple beams (#1-1, #1-2, #1-3, #2-1, #2-2, and #2-3) transmitted from the small base stations 11 and 12. It is also assumed that the two beams are transmitted from different small base stations. Also, it is assumed that each of the small base stations 11 and 12 performs communications by using one of multiple beams (#1, #2, #3, and #4) transmitted from the user device 20. For example, the user device 20 may receive a signal transmitted using the beam #1-2 from the small base station 11, transmit a signal using the beam #1 to the small base station 11, receive a signal transmitted using the beam #2-2 from the small base station 12, and transmit a signal using the beam #2 to the small base station 12.

To enable such operations, for example, the small base stations 11 and 12 transmit multiple pre-coded reference signals (which are hereafter referred to as "discovery signals") using the corresponding beams. Each discovery signal includes an identifier (which is hereafter referred to as a "downlink beam identifier") for uniquely identifying the corresponding beam transmitted from the small base station 11 or 12. The identifier may be identified based on a sequence of the discovery signal, or identified based on the allocation method of radio resources (a frequency position, a time position, or both of a frequency position and a time position). The user device 20 monitors discovery signals that are likely to be received, and measures the reception quality (e.g., received power) of detected discovery signals. Also, after measuring the received power of the detected discovery signals, the user device identifies beams (#1 through #4) through which the respective discovery signals are received. The user device 20 can identify beams through which the discovery signals are received by multiplying received signals by weights corresponding to the antenna ports.

Next, the user device 20 performs uplink beam forming, and transmits uplink reference signals to the small base stations 11 and 12 by using beams. Here, uplink beam forming indicates multiplying transmission signals by weights corresponding to the antenna ports of the user device 20. An identifier (which is hereafter referred to as an "uplink beam identifier") for uniquely identifying the corresponding beam (#1 through #4) assigned to each uplink reference signal. The identifier may be identified based on a sequence of the reference signal, or identified based on the allocation method of radio resources (a frequency position, a time position, or both of a frequency position and a time position). The uplink reference signal may be, for example, a sounding reference signal.

The uplink reference signal transmitted from the user device 20 may include, for each discovery signal received by the user device 20, information where measured reception quality (e.g., received power), a downlink beam identifier of the discovery signal, and an uplink beam identifier corresponding to a beam (which is formed by the user device) through which the discovery signal is received are associated with each other.

Next, based on the uplink reference signals received at the small base stations 11 and 12, selection of downlink beams for transmitting downlink signals to the user device 20 and selection of uplink beams for transmitting uplink signals from the user device 20 are performed. Here, the selection of the downlink beams and the uplink beams may be performed by a base station that centrally controls radio resources for the small cells formed by the small base stations 11 and 12. For example, the small base stations 11 and 12 may be configured to transmit received uplink reference signals (or the reception quality of the uplink reference signals) to the macro base station 10, and the macro base station 10 may be configured to select the downlink beams and the uplink beams. As another example, the small base station may be configured to transmit the received uplink reference signal (or the reception quality of the uplink reference signal) to the small base station 11, and the small base station 11 may be configured to select the downlink beams and the uplink beams.

In the descriptions below, it is assumed that the small base station 11 centrally controls radio resources of the radio communication system of the present embodiment, and selects downlink and uplink beams.

Based on the reception quality of discovery signals reported from the user device 20 and the reception quality of uplink reference signals received by the small base stations 11 and 12, the small base station 11 selects downlink and uplink beams.

The selection of beams may be performed in various manners. For example, as a downlink beam selection method, the small base station 11 may select a downlink beam whose reception quality (e.g., received power) reported from the user device 20 is highest among downlink beams transmitted by the small base station 11, and select a downlink beam whose reception quality (e.g., received power) reported from the user device 20 is highest among downlink beams transmitted by the small base station 12. Selecting downlink beams in this manner makes it possible to spatially separate the downlink beams used for communications with the user device 20. As an uplink beam selection method, the small base station 11 may select an uplink beam corresponding to an uplink reference signal whose reception quality (e.g., received power) is highest among uplink reference signals received by the small base station 11, and select an uplink beam corresponding to an uplink reference signal whose reception quality (e.g., received power) is highest among uplink reference signals received by the small base station 12. Selecting uplink beams in this manner makes it possible to enable the uplink beams for communications with the user device 20 to reach separate small base stations and to spatially separate the uplink beams.

The downlink beam selection method and the uplink beam selection method described above are examples, and other selection methods may also be used. For example, when the radio communication system of the present embodiment is a TDD system, the small base station 11 may be configured to use receiving directions (uplink beam directions) in which downlink beams selected in a downlink beam selection process are received at the user device 20 as uplink beams for uplink communications. This uplink beam selection method is based on the uplink-downlink symmetry (where downlink propagation characteristics are the same as uplink propagation characteristics) of a TDD system where the same frequency band is used for uplink and downlink.

The outline of the present embodiment is described above. However, when uplink and downlink communications are performed between multiple small base stations (11, 12) and the user device 20 by using different beams, the radio communication system of the present embodiment may employ various control schemes to achieve efficient communication.

For example, the radio communication system of the present embodiment may be configured such that different transmission timing control schemes are applied to respective uplink beams transmitted from the user device 20 to multiple small base stations. With this configuration, in uplink communications, the radio communication system of the present embodiment can increase the communication capacity or achieve a diversity gain to improve the throughput.

Also, the radio communication system of the present embodiment may be configured to perform radio resource allocation for shared channels (such as PUSCH) included in multiple uplink beams at once by using a specific downlink beam. With this configuration, the radio communication system of the present embodiment enables efficient transmission of control signals.

As another example, in a case where a downlink signal (e.g., PDSCH) is transmitted using each of multiple downlink beams transmitted from different small base stations, the radio communication system of the present embodiment enables the user device 20 to control the reception timing of the beams independently. With this configuration, in downlink communications, the radio communication system of the present embodiment can increase the communication capacity and achieve a diversity gain to improve the throughput.

Further, the radio communication system of the present embodiment may be configured to perform radio resource allocation for downlink signals (such as PDSCH, CSI-RS, and a synchronization channel) included in multiple downlink beams at once by using a specific downlink beam. With this configuration, the radio communication system of the present embodiment enables efficient transmission of control signals.

<Functional Configurations>
(Small Base Station)

Figure 2:
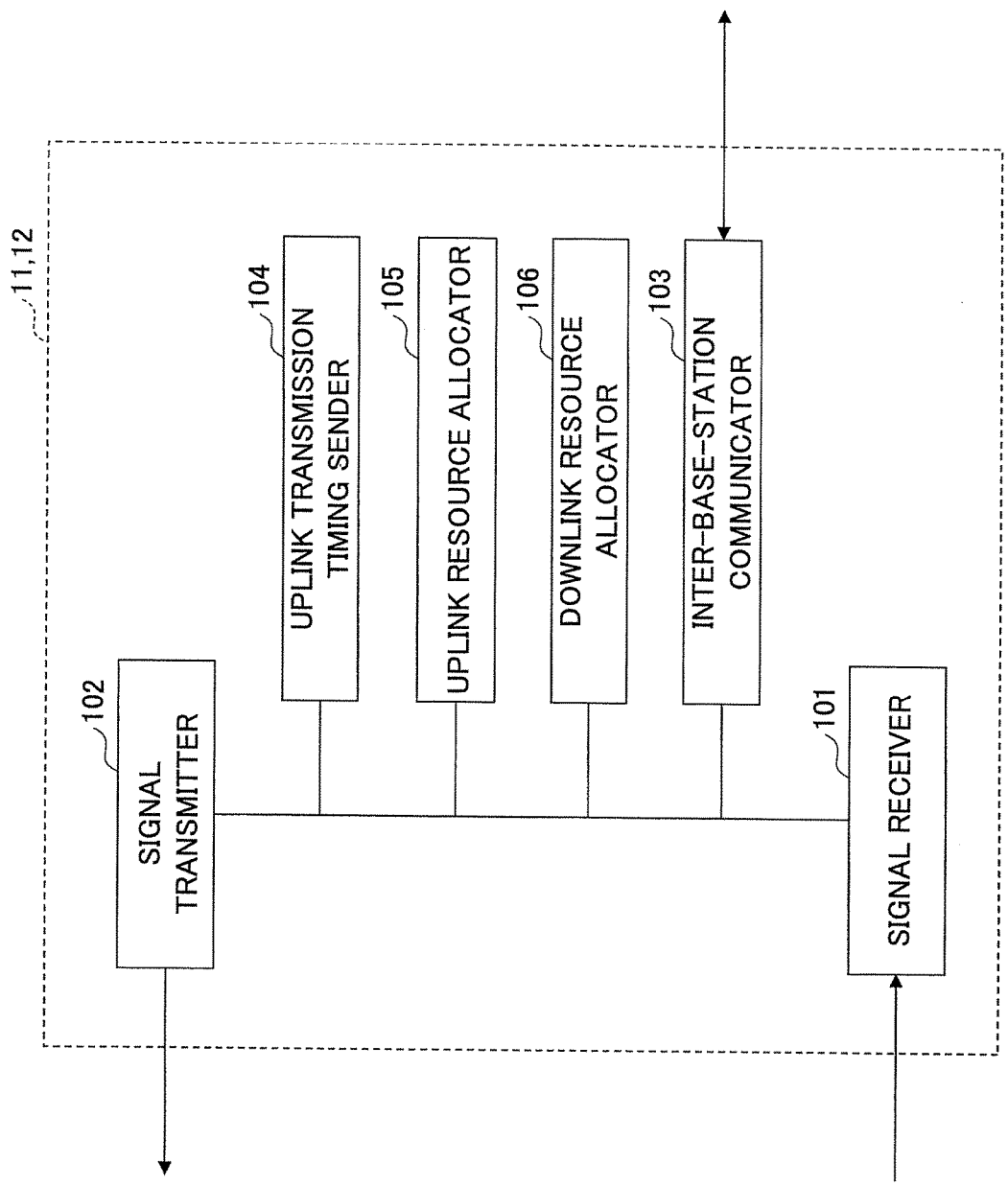
FIG. 2 is a drawing illustrating an example of a functional configuration of a small base station according to an embodiment.

FIG. 2 is a drawing illustrating an example of a functional configuration of a small base station according to an embodiment. As illustrated by FIG. 2, each of the small base stations 11 and 12 include a signal receiver 101, a signal transmitter 102, an inter-base-station communicator 103, an uplink transmission timing sender 104, an uplink resource allocator 105, and a downlink resource allocator 106. FIG. 2 illustrates only functional components of the small base stations 11 and 12 that are particularly relevant to the present embodiment, and the small base stations 11 and 12 may also at least include unshown functional components that are necessary for operations conforming to LTE. Also, the functional configuration of FIG. 2 is just an example. As long as operations related to the present embodiment can be performed, the categorization and the names of the functional components may be freely changed. Also, as long as the small base stations 11 and 12 can perform operations related to the present embodiment, one or more of the functional components in FIG. 2 may be omitted.

The signal receiver 101 obtains upper layer information from a wirelessly-received lower layer signal.

The signal transmitter 102 generates a lower layer signal from upper layer information, and wirelessly transmits the lower layer signal. Also, the signal transmitter 102 performs beam forming by multiplying signals of respective antenna ports by predetermined weights, and thereby transmits radio signals in the form of beams.

The inter-base-station communicator 103 is connected to a backhaul line such as an optical fiber, and includes a function to communicate with the macro base station 10 or another small base station (11 or 12). The inter-base-station communicator 103 is used to transmit and receive various signals between a base station for centrally controlling radio resources and another base station as necessary.

The uplink transmission timing sender 104 sends an instruction indicating the transmission timing of each uplink beam to the user device 20. For example, the uplink transmission timing sender 104 may be configured to send, to the user device 20, an instruction indicating the transmission timing of each uplink beam for each subframe (i.e., one TTI) that contains an uplink control signal or an uplink data signal. Also, the uplink transmission timing sender 104 may be configured to send an instruction indicating the transmission timing of each uplink beam to the user device 20 at an interval greater than a subframe (one TTI) when necessary. Also, the uplink transmission timing sender 104 may be configured to send instructions indicating the transmission timings of multiple uplink beams to the user device 20 at one time. Further, the uplink transmission timing sender 104 may be configured to send an instruction indicating the transmission timing of an uplink beam to the user device 20 based on an instruction received from another base station via the inter-base-station communicator 103.

The uplink resource allocator 105 allocates uplink radio resources to the user device 20. For example, the uplink resource allocator 105 may be configured to allocate uplink radio resources for an uplink beam used by the user device 20 to communicate with the small base station 11 and an uplink beam used by the user device 20 to communicate with the small base station 12. Also, the uplink resource allocator 105 may be configured to allocate uplink radio resources for a specific uplink beam based on an instruction received from another base station via the inter-base-station communicator 103, or to report, to another small base station, radio resources to be allocated for an uplink beam to be received by the other small base station. The allocated uplink radio resources are reported via the signal transmitter 102 to the user device 20.

The downlink resource allocator 106 allocates downlink radio resources to the user device 20. For example, the downlink resource allocator 106 may be configured to allocate different downlink radio resources or the same downlink radio resources for a downlink beam used by the small base station 11 to communicate with the user device 20 and a downlink beam used by the small base station 12 to communicate with the user device 20. Also, the downlink resource allocator 106 may be configured to allocate downlink radio resources for a specific downlink beam based on an instruction received from another base station via the inter-base-station communicator 103, or to report, to another small base station, radio resources to be allocated for a downlink beam to be transmitted from the other small base station. The allocated downlink radio resources are reported via the signal transmitter 102 to the user device 20.

(User Device)

Figure 3:
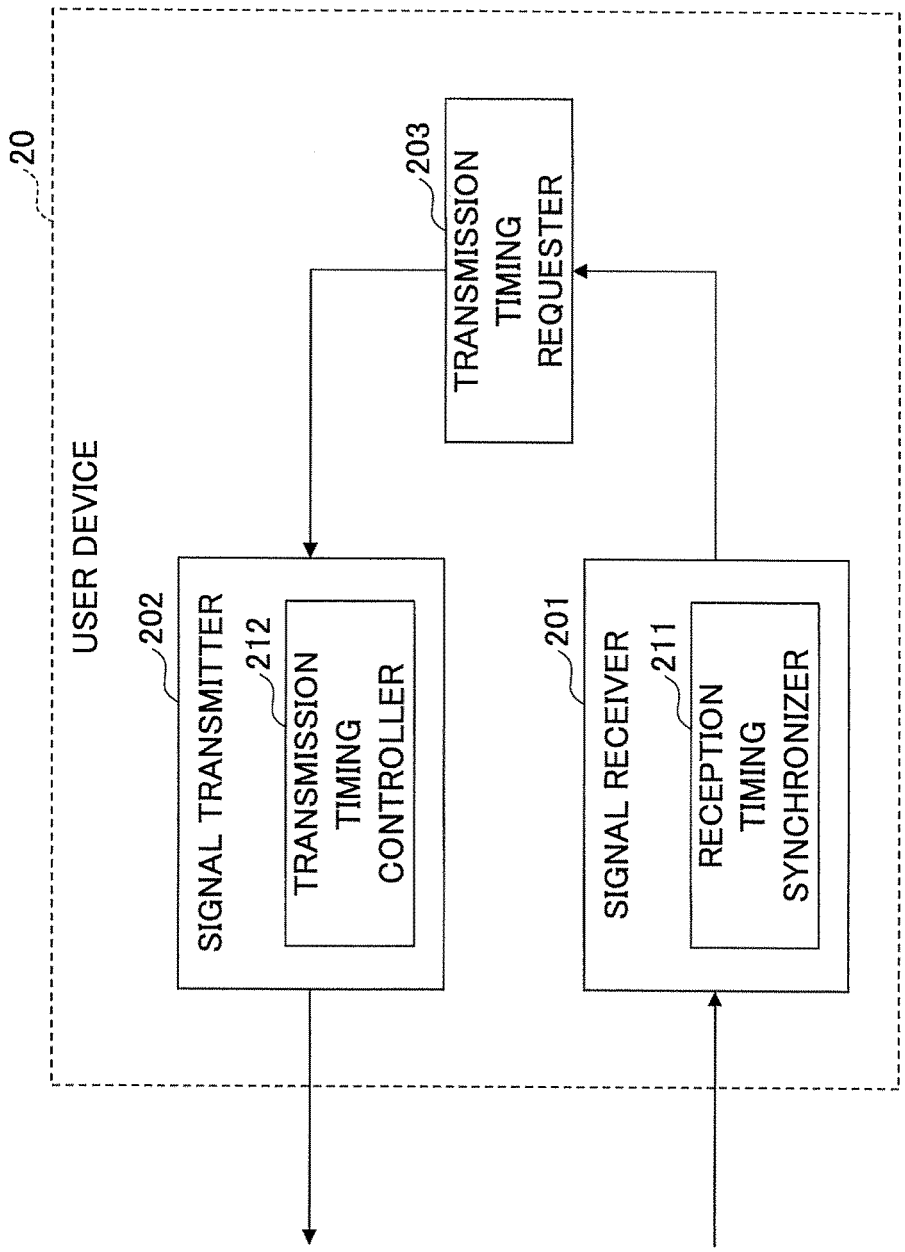
FIG. 3 is a drawing illustrating an example of a functional configuration of a user device according to an embodiment.

FIG. 3 is a drawing illustrating an example of a functional configuration of a user device according to an embodiment. As illustrated by FIG. 3, the user device 20 includes a signal receiver 201, a signal transmitter 202, and a transmission timing requester 203. The signal receiver 201 includes a reception timing synchronizer 211. The signal transmitter 202 includes a transmission timing controller 212. FIG. 3 illustrates only functional components of the user device 20 that are particularly relevant to the present embodiment, and the user device 20 may also at least include unshown functional components that are necessary for operations conforming to LTE. Also, the functional configuration of FIG. 3 is just an example. As long as operations related to the present embodiment can be performed, the categorization and the names of the functional components may be freely changed. Also, as long as the user device 20 can perform operations related to the present embodiment, one or more of the functional components in FIG. 3 may be omitted.

The signal receiver 201 obtains upper layer information from a wirelessly-received lower layer signal.

The signal transmitter 202 generates a lower layer signal from upper layer information, and wirelessly transmits the lower layer signal. Also, the signal transmitter 202 performs beam forming by multiplying signals of respective antenna ports by predetermined weights, and thereby transmits radio signals in the form of beams.

The reception timing synchronizer 211 controls the signal receiver 201 to synchronize at different reception timings with separate downlink beams transmitted from the small base stations 11 and 12. The transmission timing controller 212 controls the signal transmitter 202 to change the transmission timing for each uplink beam based on control signals transmitted from the small base stations 11 and 12. Changing the transmission timing for each uplink beam indicates changing the subframe start timing of an uplink signal for each uplink beam.

The transmission timing requester 203 measures downlink signals transmitted from multiple small base stations to detect a difference in the reception timing between the downlink signals (a difference in the start timing of the subframe), and requests one or more of the small base stations to change the transmission timing of the downlink signal to eliminate the difference in the reception timing between the downlink signals from the small base stations.

The entire functional configuration of each of the small base stations 11 and 12 and the user device 20 described above may be implemented by a hardware circuit(s) (e.g., one or more IC chips). Alternatively, a part of the functional configuration of each of the small base stations 11 and 12 and the user device 20 may be implemented by a hardware circuit(s) and the remaining part of the functional configuration may be implemented by a CPU and programs.

(Small Base Stations)

Figure 4:
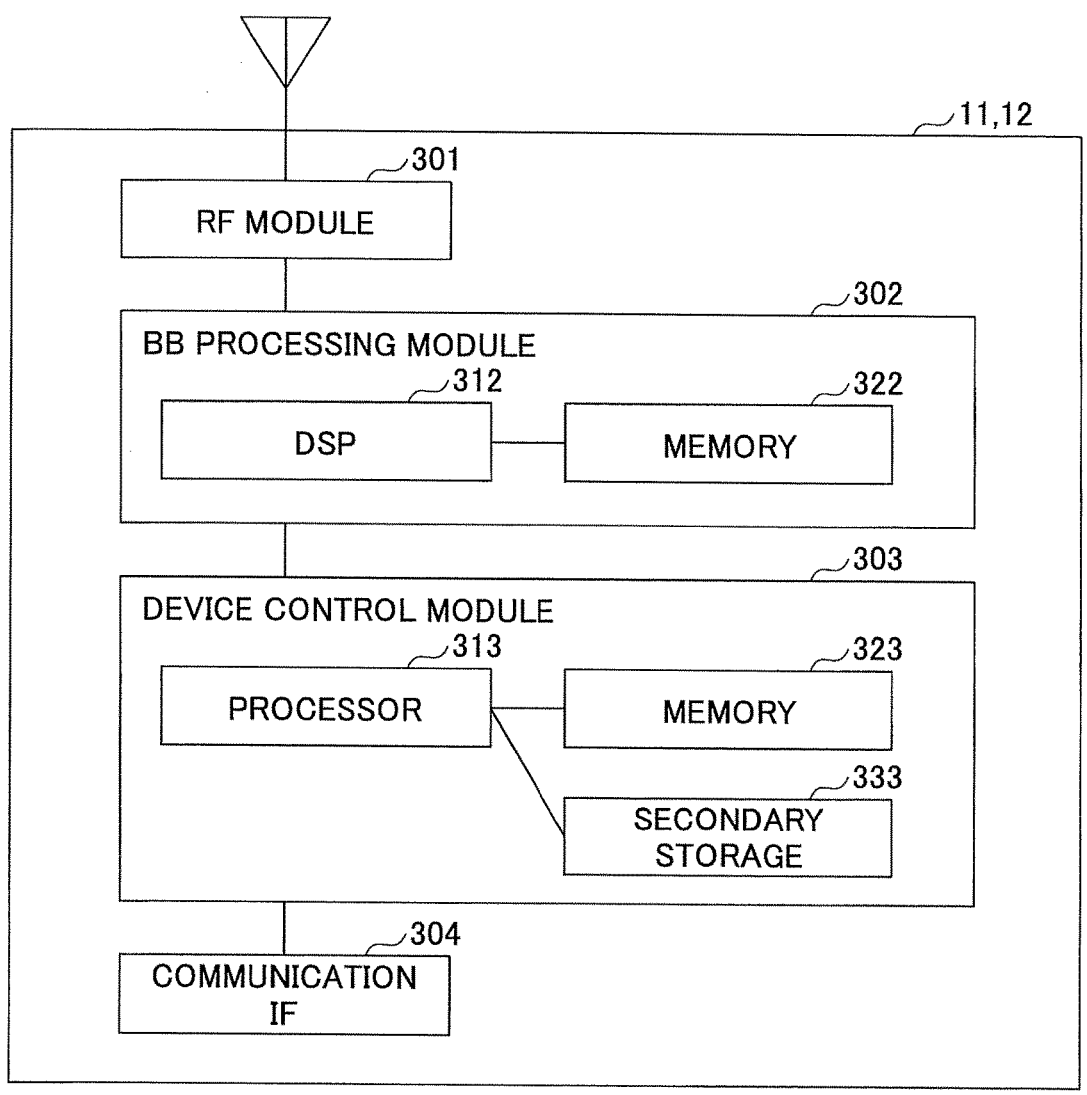
FIG. 4 is a drawing illustrating an example of a hardware configuration of a small base station according to an embodiment.

FIG. 4 is a drawing illustrating an example of a hardware configuration of a small base station according to an embodiment. FIG. 4 illustrates a configuration that is closer than FIG. 2 to an actual implementation. As illustrated by FIG. 4, each of the small base stations 11 and 12 includes a radio frequency (RE) module 301 that performs processes related to radio signals, a baseband (BB) processing module 302 that performs baseband signal processing, a device control module 303 that performs processes in upper layers, and a communication IF 304 that is an interface for connecting with a network.

The RF module 301 performs processes such as digital-to-analog (D/A) conversion, modulation, frequency conversion, and power amplification on a digital baseband signal received from the BB processing module 302 to generate a radio signal to be transmitted from an antenna. Also, the RF module 301 performs processes such as frequency conversion, analog-to-digital (A/D) conversion, and modulation on a received radio signal to generate a digital baseband signal, and sends the digital baseband signal to the BB processing module 302. The RF module 301 may include, for example, a part of the signal receiver 101 and a part of the signal transmitter 102 in FIG. 2.

The BB processing module 302 converts an IP packet into a digital baseband signal and vice versa. A digital signal processor (DSP) 312 is a processor that performs signal processing in the BB processing module 302. A memory 322 is used as a work area of the DSP 312. The BB processing module 302 may include, for example, a part of the signal receiver 101, a part of the signal transmitter 102, the uplink transmission timing sender 104, the uplink resource allocator 105, and the downlink resource allocator 106 in FIG. 2.

The device control module 303 performs protocol processing in the IP layer and operation and maintenance (OAM) processing. A processor 313 performs processes of the device control module 303. A memory 323 is used as a work area of the processor 313. A secondary storage 333 is, for example, an HDD and stores various settings for operations of the small base station 11/12 itself. The device control module 303 may include, for example, a part of the inter-base-station communicator 103 in FIG. 2. The communication IF 304 may include, for example, a part of the inter-base-station communicator 103 in FIG. 2.

(User Device)

Figure 5:
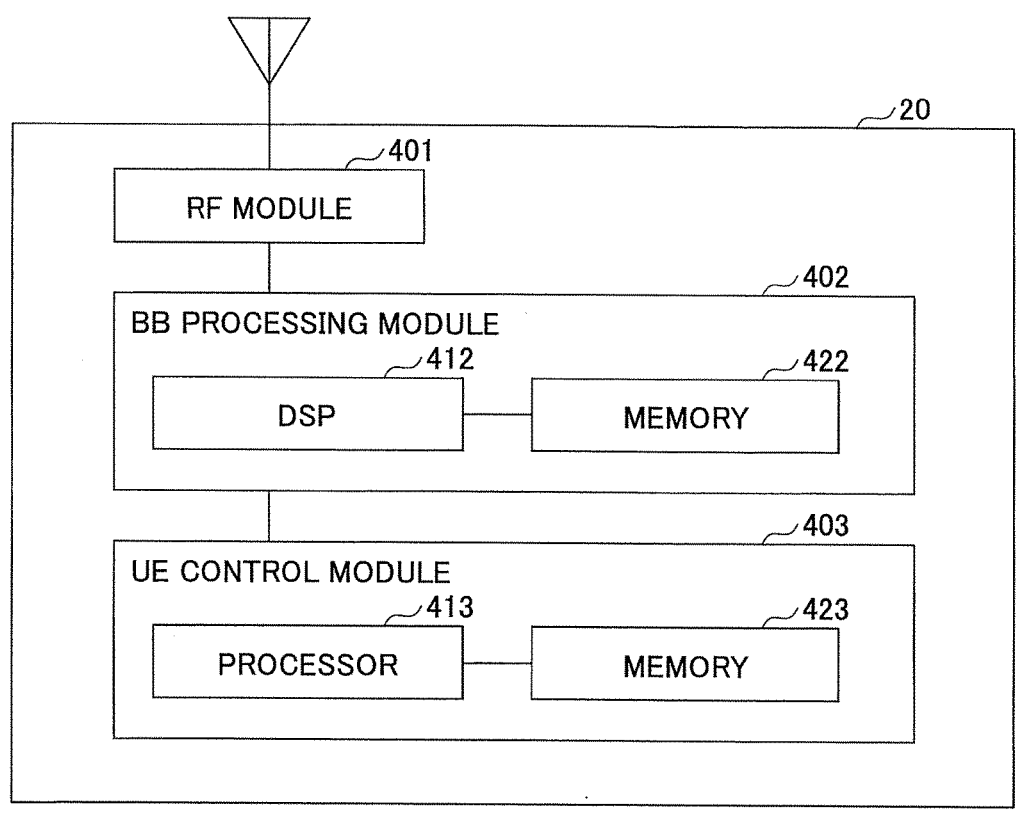
FIG. 5 is a drawing illustrating an example of a hardware configuration of a user device according to an embodiment.

FIG. 5 is a drawing illustrating an example of a hardware configuration of a user device according to an embodiment. FIG. 5 illustrates a configuration that is closer than FIG. 3 to an actual implementation. As illustrated by FIG. 5, the user device UE includes an RE module 401 that performs processes related to radio signals, a BB processing module 402 that performs baseband signal processing, and a UE control module 403 that performs processes in upper layers.

The RF module 401 performs processes such as D/A conversion, modulation, frequency conversion, and power amplification on a digital baseband signal received from the BB processing module 402 to generate a radio signal to be transmitted from an antenna. Also, the RF module 401 performs processes such as frequency conversion, A/D conversion, and modulation on a received radio signal to generate a digital baseband signal, and sends the digital baseband signal to the BB processing module 402. The RF module 401 may include, for example, a part of the signal receiver 201 and a part of the signal transmitter 202 in FIG. 3.

The BB processing module 402 converts an IP packet into a digital baseband signal and vice versa. A DSP 412 is a processor that performs signal processing in the BB processing module 402. A memory 422 is used as a work area of the DSP 412. The BB processing module 402 may include, for example, a part of the signal receiver 201, a part of the signal transmitter 202, and the transmission timing requester 203 in FIG. 3.

The UE control module 403 performs protocol processing in the IP layer and processes related to applications. A processor 413 performs processes of the UE control module 403. A memory 423 is used as a work area of the processor 413.

<Processes>

(Uplink Signal Transmission Processes)

Next, processes performed in the radio communication system of the present embodiment to control uplink signals transmitted from the user device 20 to the small base stations 11 and 12 are described. Various types of processes may be used to control uplink signals. An uplink signal transmission process (1) is described with reference to FIGS. 6 through 8, an uplink signal transmission process (2) is described with reference to FIGS. 9 through 11, and an uplink signal transmission process (3) is described with reference to FIGS. 12 through 14.

[Transmission Process (1)]

Figure 6:
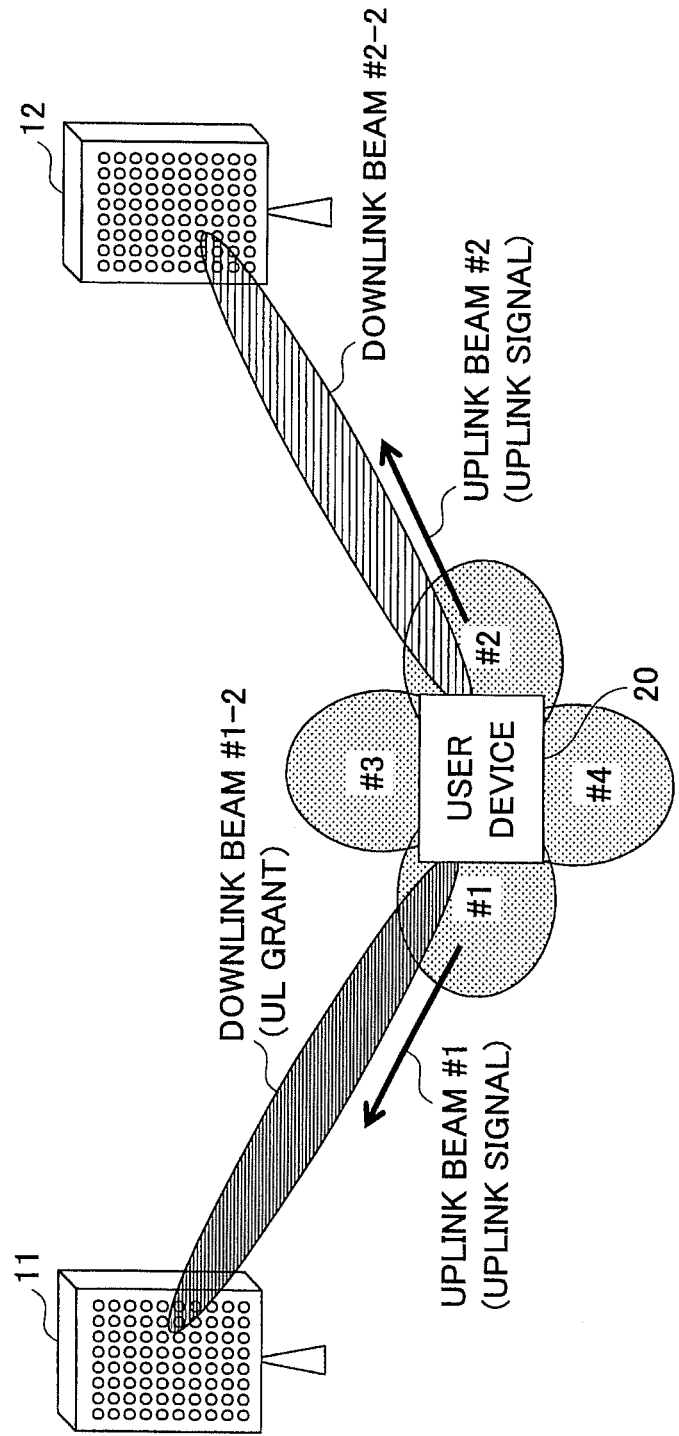
FIG. 6 is a drawing illustrating an outline of an uplink signal transmission process (1)

FIG. 6 is a drawing illustrating an outline of the uplink signal transmission process (1). As illustrated in FIG. 6, the small base station 11 transmits a downlink signal to the user device 20 by using a downlink beam #1-2. Also, the small base station 12 transmits a downlink signal to the user device 20 by using a downlink beam #2-2. Further, the user device 20 transmits an uplink signal to the small base station 11 by using an uplink beam #1, and transmits an uplink signal to the small base station 12 by using an uplink beam #2.

In the uplink signal transmission process (1), according to an instruction from the small base station 11, the user device 20 separately controls the transmission timing of the uplink signal to be transmitted using the uplink beam #1 to the small base station 11 and the transmission timing of the uplink signal to be transmitted using the uplink beam #2 to the small base station 12.

For example, when the distance between the user device 20 and the small base station 11 is different from the distance between the user device 20 and the small base station 12, an uplink signal transmitted from the user device 20 reaches the small base station 11 at a timing different from the timing at which the uplink signal reaches the small base station 12. Using the uplink signal transmission process (1) makes it possible to synchronize an uplink signal received at the small base station 11 with an uplink signal received at the small base station 12.

Figure 7:
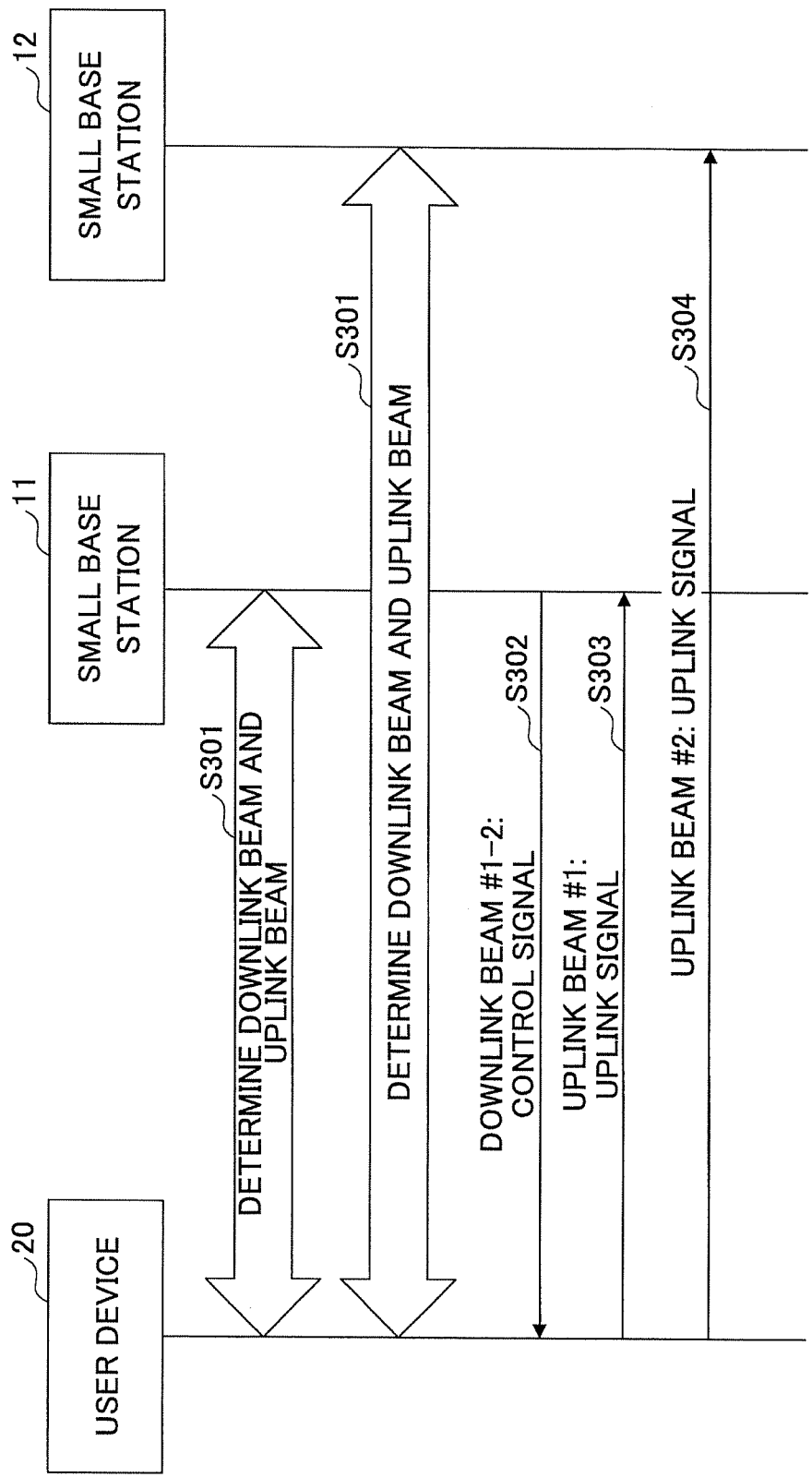
FIG. 7 is an example of a sequence chart illustrating the uplink signal transmission process (1)

The user device 20 receives, from the small base station 11, an instruction regarding the allocation of radio resources for both of the uplink signal to be transmitted using the uplink beam #1 to the small base station 11 and the uplink signal to be transmitted using the uplink beam #2 to the small base station 12. FIG. 7 is an example of a sequence chart illustrating the uplink signal transmission process (1). Details of the uplink signal transmission process (1) are described below with reference to FIG. 7. In the example of FIG. 7, it is assumed that the small base station 11 centrally controls radio resources for small cells formed by the small base stations 11 and 12.

At step S301, downlink beams used for transmission of downlink signals and uplink beams used for transmission of uplink signals are determined between the small base stations 11 and 12 and the user device 20. As described above, the small base station 11 may be configured to select downlink beams and uplink beams based on the reception quality of discovery signals in respective downlink beams that is reported from the user device 20 and the reception quality of uplink reference signals (e.g., sounding reference signals) received by the small base stations 11 and 12.

Here, it is assumed that beams are selected at step S301 such that the small base station 11 transmits a downlink signal to the user device 20 using the downlink beam #1-2, and the small base station 12 transmits a downlink signal to the user device 20 using the downlink beam #2-2. Similarly, it is assumed that beams are selected such that the user device 20 transmits an uplink signal to the small base station 11 using the uplink beam #1 and transmits an uplink signal to the small base station 12 using the uplink beam #2.

Step S301 may be performed whenever it is necessary. That is, beams used by the small base stations 11 and 12 and the user device 20 may be changed to optimal beams as necessary according to changes in the communication quality and the movement of the user device 20.

At step S302, the signal transmitter 102 of the small base station 11 transmits a control signal to the user device 20. The control signal may be, for example, an UL grant to be transmitted via a physical layer control channel (e.g., PDCCH).

Figure 8:
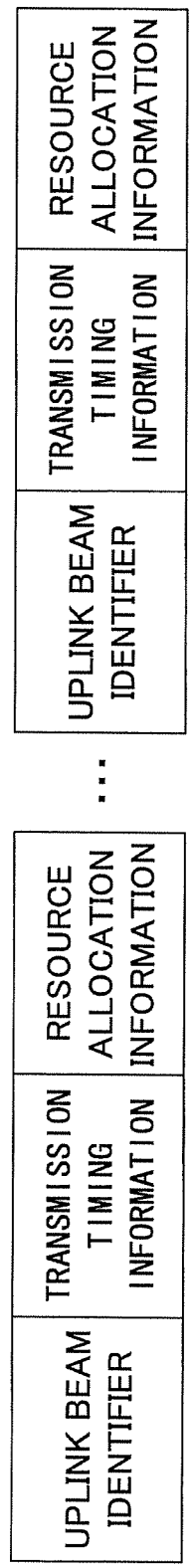
FIG. 8 is a drawing illustrating an exemplary format of a control signal used in the uplink signal transmission process (1)

FIG. 8 is a drawing illustrating an exemplary format of a control signal used in the uplink signal transmission process (1). As illustrated by FIG. 8, multiple combinations of information items including "uplink beam identifier", "transmission timing information", and "resource allocation information" are contained in the control signal used in the uplink signal transmission process (1). The transmission timing information indicates a transmission timing of an uplink signal to be transmitted using an uplink beam identified by the uplink beam identifier. For example, the transmission timing information may be a command that indicates an amount of time by which the current transmission timing is advanced (or delayed). The resource allocation information indicates radio resources allocated to the uplink signal to be transmitted by the user device 20, and may have a format similar to the format of resource allocation information used in the current LTE standard. The control signal may be, for example, mapped to downlink control information (DCI) included in a physical layer control channel (PDCCH).

The format of FIG. 8 may include one set of resource allocation information for multiple uplink beams instead of including resource allocation information for each uplink beam. This is because there is a case where the user device 20 transmits uplink signals containing the same information by using multiple uplink beams to the small base stations 11 and 12.

In the uplink signal transmission process (1), as illustrated in FIG. 6, the user device 20 transmits an uplink signal to the small base station 11 by using the uplink beam #1, and transmits an uplink signal to the small base station 12 by using the uplink beam #2. In this case, the control signal of FIG. 8 includes an uplink beam identifier, transmission timing information, and resource allocation information for the uplink beam #1, and an uplink beam identifier, transmission timing information, and resource allocation information for the uplink beam #2.

The resource allocation information may be generated by the uplink resource allocator 105 of the small base station 11, and the transmission timing information may be generated by the uplink transmission timing sender 104 of the small base station 11.

Referring back to FIG. 7, at step S303, the signal transmitter 202 and the transmission timing controller 212 of the user device 20 transmit an uplink signal to the small base station 11 through the uplink beam #1 at the transmission timing and using the radio resources indicated by the control signal. The uplink signal is, for example, but not limited to, a PUSCH signal.

At step S304, the signal transmitter 202 and the transmission timing controller 212 of the user device 20 transmit an uplink signal to the small base station 12 through the uplink beam #2 at the transmission timing and using the radio resources indicated by the control signal. The uplink signal is, for example, but not limited to, a PUSCH signal.

The small base stations 11 and 12 and the user device 20 may be configured to perform steps S302 through S304 for each subframe.

The user device 20 does not need to recognize that the uplink beam #1 is directed to the small base station 11 and the uplink beam #2 is directed to the small base station 12. That is, the user device 20 only needs to transmit uplink signals using multiple uplink beams according to instructions from the small base station 11, and does not need to recognize small base stations to which the uplink beams are directed.

The uplink signal transmission process (1) is described above. For example, applying this transmission process to transmission of PUSCH makes it possible to achieve orthogonality between the user device 20 and another user device 20 and to increase the communication capacity of user data through MIMO spatial multiplexing that is realized by multiple uplink beams transmitted from the user device 20. In the timing advance control (TA control) in the current LTE standard, a timing control command is transmitted through a medium access control (MAC) layer. On the other hand, the above process makes it possible to transmit a control signal using a physical layer control channel at step S302. This in turn makes it possible to perform detailed transmission timing control for each subframe.

[Transmission Process (2)]

Next, an uplink signal transmission process (2) is described. Details of the uplink signal transmission process (2) not mentioned below may be the same as those of the uplink signal transmission process (1).

Figure 9:
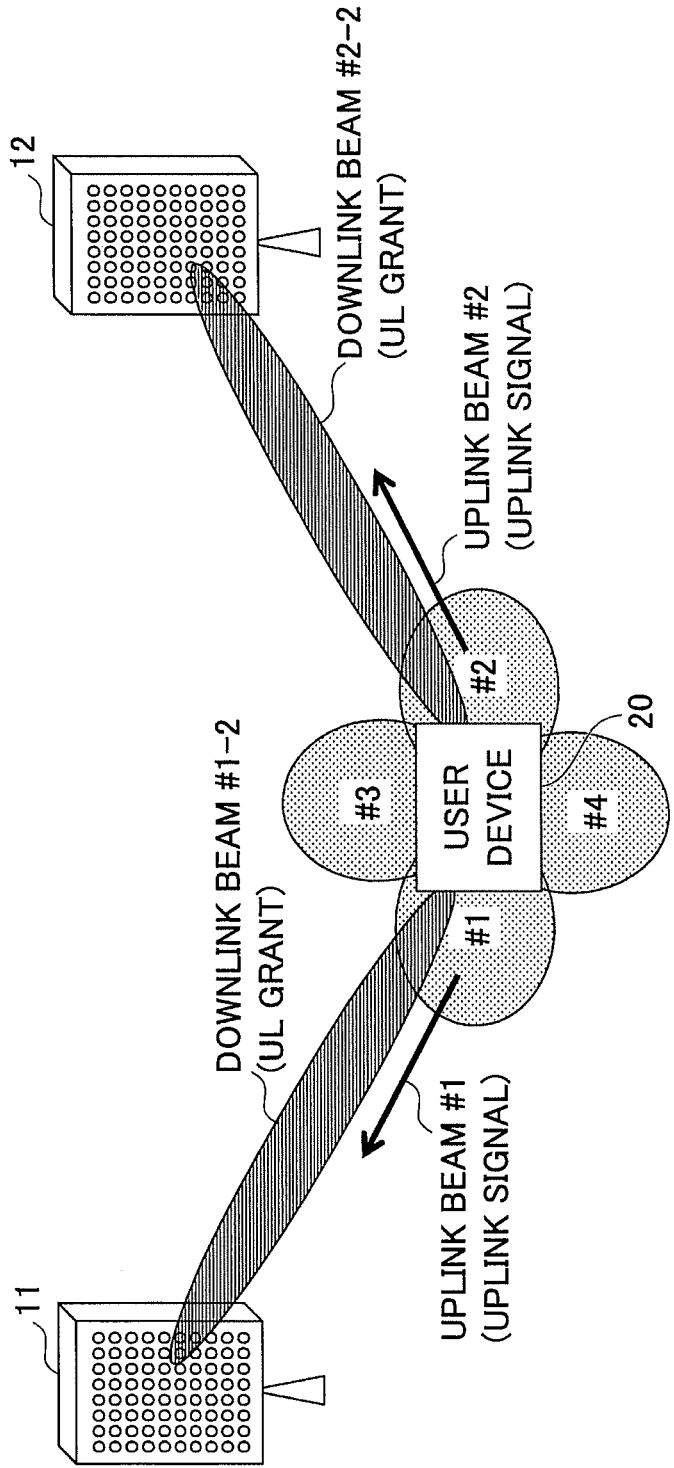
FIG. 9 is a drawing illustrating an outline of an uplink signal transmission process (2)

FIG. 9 is a drawing illustrating an outline of the uplink signal transmission process (2). As illustrated in FIG. 9, the small base station 11 transmits a downlink signal to the user device 20 by using a downlink beam #1-2. Also, the small base station 12 transmits a downlink signal to the user device 20 by using a downlink beam #2-2. Further, the user device 20 transmits an uplink signal to the small base station 11 by using an uplink beam #1, and transmits an uplink signal to the small base station 12 by using an uplink beam #2.

In the uplink signal transmission process (2), according to an instruction from the small base station 11, the user device 20 controls the transmission timing of the uplink signal to be transmitted using the uplink beam #1 to the small base station 11. Also, according to an instruction from the small base station 12, the user device 20 controls the transmission timing of the uplink signal to be transmitted using the uplink beam #2 to the small base station 12.

The user device 20 receives, from the small base station 11, an instruction regarding the allocation of radio resources for the uplink signal to be transmitted using the uplink beam #1 to the small base station 11, and receives, from the small base station 12, an instruction regarding the allocation of radio resources for the uplink signal to be transmitted using the uplink beam #2 to the small base station 12.

Thus, the uplink signal transmission process (2) is different from the uplink signal transmission process (1) in that each of the small base stations 11 and 12 transmits a control signal for an uplink signal to the user device 20.

Figure 10:
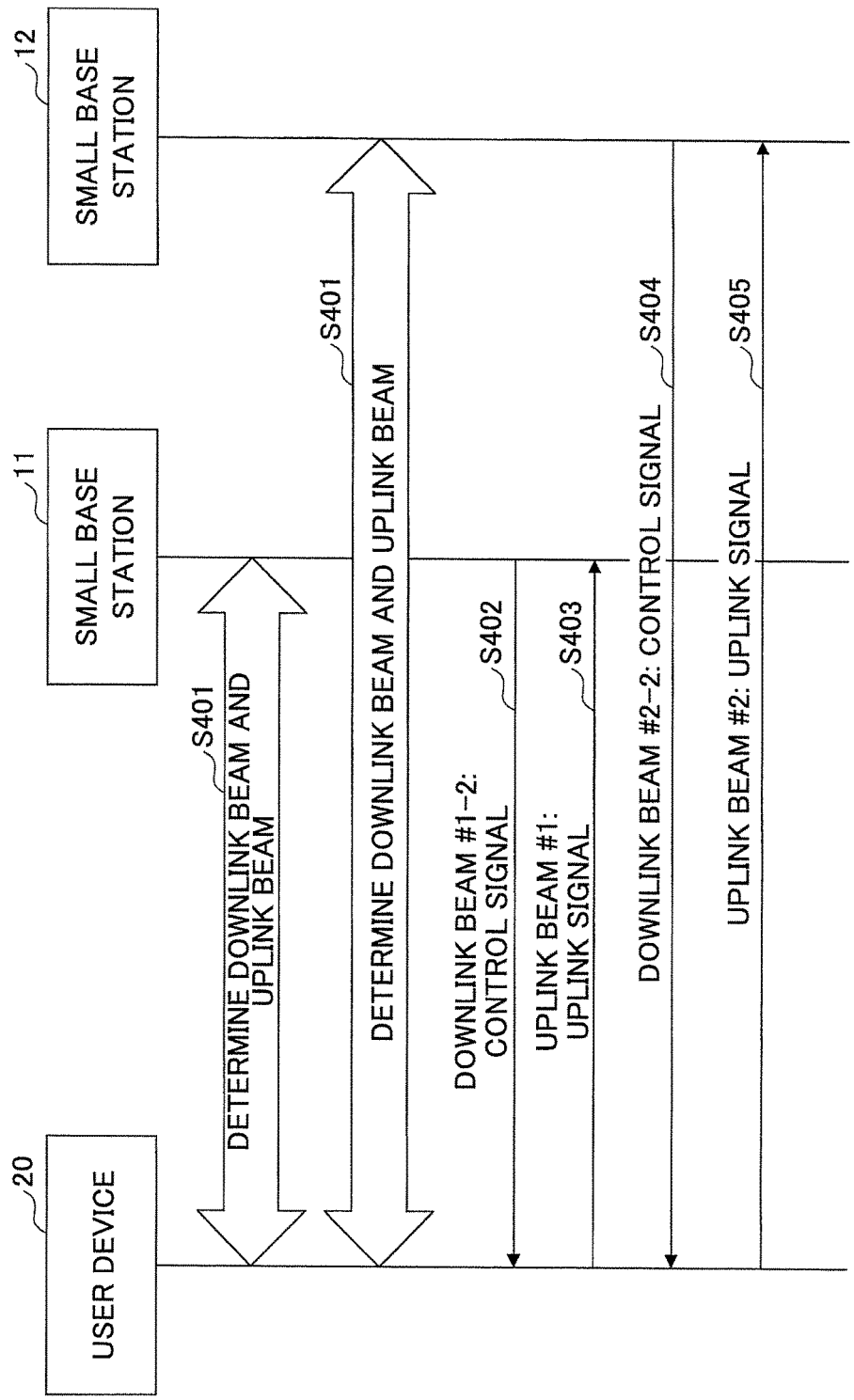
FIG. 10 is an example of a sequence chart illustrating the uplink signal transmission process (2)

FIG. 10 is an example of a sequence chart illustrating the uplink signal transmission process (2). Details of the uplink signal transmission process (2) are described below with reference to FIG. 10.

At step S401, downlink beams used for transmission of downlink signals and uplink beams used for transmission of uplink signals are determined between the small base stations 11 and 12 and the user device 20. Step S401 is substantially the same as step S301, and therefore the description of step S401 is omitted here.

At step S402, the signal transmitter 102 of the small base station 11 transmits a control signal to the user device 20. The control signal may be, for example, an UL grant to be transmitted via a physical layer control channel (e.g., PDCCH or EPDCCH).

FIG. 11 is a drawing illustrating an exemplary format of a control signal used in the uplink signal transmission process (2). As illustrated by FIG. 11, "uplink beam identifier", "transmission timing information", and "resource allocation information" are contained in the control signal used in the uplink signal transmission process (2).

As illustrated in FIG. 9, in the uplink signal transmission process (2), the user device 20 transmits an uplink signal to the small base station 11 by using the uplink beam #1. In this case, the control signal of FIG. 11 includes an uplink beam identifier, transmission timing information, and resource allocation information for the uplink beam #1.

The resource allocation information may be generated by the uplink resource allocator 105 of the small base station 11, and the transmission timing information may be generated by the uplink transmission timing sender 104 of the small base station 11.

Referring back to FIG. 10, at step S403, the signal transmitter 202 and the transmission timing controller 212 of the user device 20 transmit an uplink signal to the small base station 11 through the uplink beam #1 at the transmission timing indicated by the control signal received at step S402. The uplink signal is, for example, but not limited to, a PUSCH signal. At step S404, the signal transmitter 102 of the small base station 12 transmits a control signal to the user device 20. The control signal may be, for example, an UL grant to be transmitted via a physical layer control channel (e.g., PDCCH). The format of the control signal transmitted at step S404 is substantially the same as the format of the control signal transmitted at step S402, and therefore its description is omitted here. In this case, the control signal includes an uplink beam identifier, transmission timing information, and resource allocation information for the uplink beam #2.

The resource allocation information may be generated by the uplink resource allocator 105 of the small base station 11, and reported via the inter-base-station communicator 103 to the small base station 12. Similarly, the transmission timing information may be generated by the uplink transmission timing sender 104 of the small base station 11, and reported via the inter-base-station communicator 103 to the small base station 12. This is because the small base station 11 centrally controls radio resources of small cells formed by the small base stations 11 and 12, and there may be a case where it is preferable that the small base station centrally controls the processing of uplink signals received from the user device 20.

Referring back to FIG. 10, at step S405, the signal transmitter 202 and the transmission timing controller 212 of the user device 20 transmit an uplink signal to the small base station 12 through the uplink beam #2 at the transmission timing indicated by the control signal received at step S404. The uplink signal is, for example, but not limited to, a PUSCH signal. The small base stations 11 and 12 and the user device 20 may be configured to perform steps S402 through S405 for each subframe. Also, steps S402 and S403 and steps S404 and S405 may be performed at independent timings.

The user device 20 does not need to recognize that the uplink beam #1 is directed to the small base station 11 and the uplink beam #2 is directed to the small base station 12. That is, the user device 20 only needs to transmit uplink signals using multiple uplink beams according to instructions from the small base stations 11 and 12, and does not need to recognize small base stations to which the uplink beams are directed. The uplink signal transmission process (2) is described above. For example, applying this transmission process to transmission of PUSCH makes it possible to achieve orthogonality between the user device 20 and another user device 20 and to increase the communication capacity of user data through MIMO spatial multiplexing that is realized by multiple uplink beams transmitted from the user device 20. In the timing advance control (TA control) in the current LTE standard, a timing control command is transmitted through a medium access control (MAC) layer. On the other hand, the above process makes it possible to transmit a control signal using a physical layer control channel at each of steps S402 and S404. This in turn makes it possible to perform detailed transmission timing control for each subframe.

[Transmission Process (3)]

Next, an uplink signal transmission process (3) is described. Details of the uplink signal transmission process (3) not mentioned below may be the same as those of the uplink signal transmission process (1).

Figure 12:
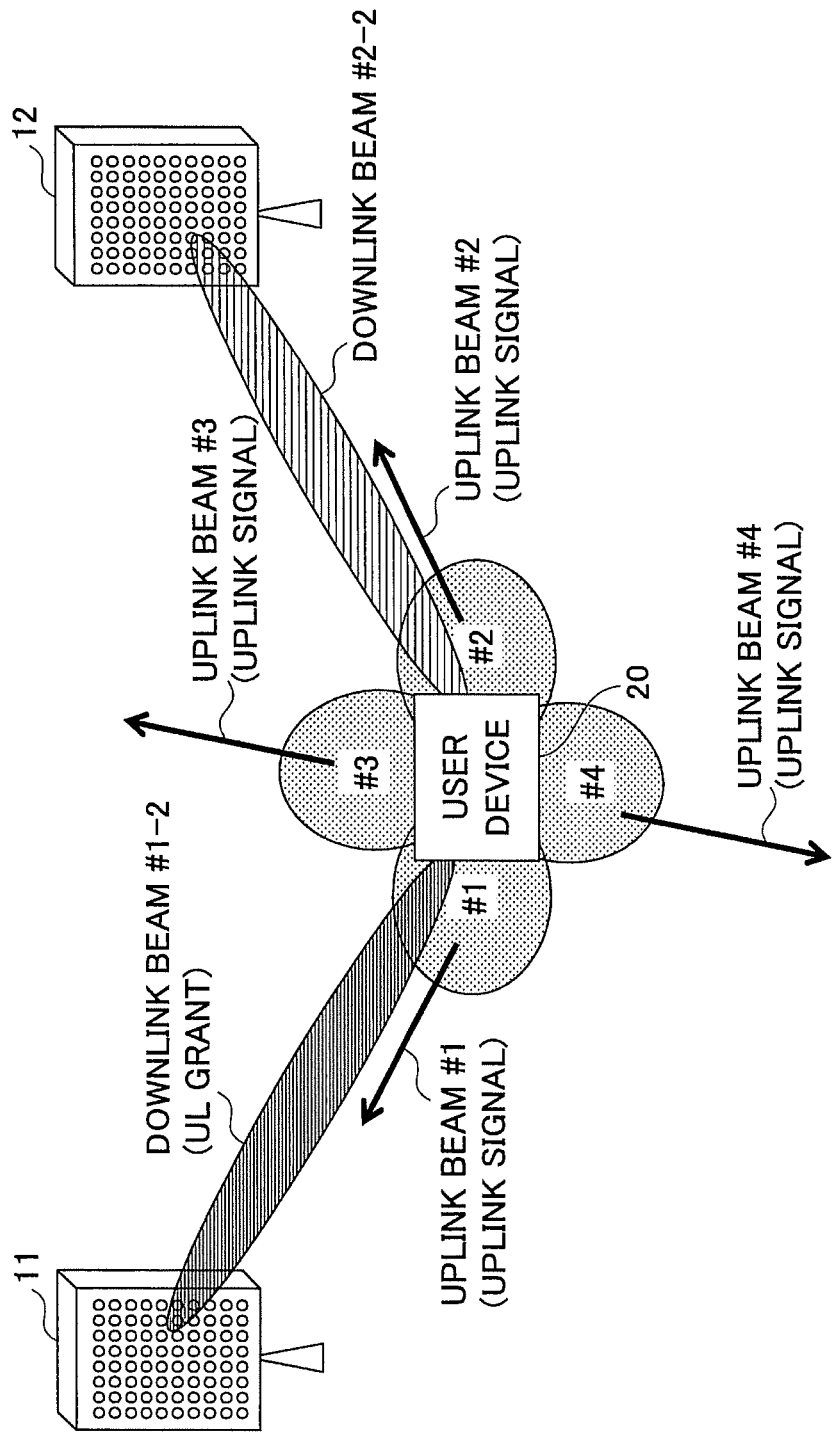
FIG. 12 is a drawing illustrating an outline of an uplink signal transmission process (3)

FIG. 12 is a drawing illustrating an outline of the uplink signal transmission process (3). As illustrated in FIG. 12, the small base station 11 transmits a downlink signal to the user device 20 by using a downlink beam #1-2. Also, the small base station 12 transmits a downlink signal to the user device 20 by using a downlink beam #2-2. Further, the user device 20 transmits uplink signals by using uplink beams #1 through #4. The user device 20 may be configured to transmit uplink signals containing the same information by using the uplink beams #1 through #4 or to transmit uplink signals containing different sets of information by using orthogonal resources.

In the example of FIG. 12, it is assumed that the uplink signal transmitted using the uplink beam #1 is directed to the small base station 11 and the uplink signal transmitted using the uplink beam #2 is directed to the small base station 12. However, the user device does not need to recognize small base stations to which uplink signals transmitted using the respective uplink beams are directed.

In the uplink signal transmission process (3), according to instructions from the small base station 11, the user device 20 controls the transmission timing of all uplink signals to be transmitted using the uplink beams #1 through #4. That is, different from the uplink signal transmission process (1) and the uplink signal transmission process (2), the user device 20 transmits all uplink signals at the same transmission timing instead of using different transmission timings for the uplink beams. Also, the user device 20 receives, from the small base station 11, instructions regarding the allocation of radio resources for the uplink signals to be transmitted using the uplink beams #1 through #4.

Figure 13:
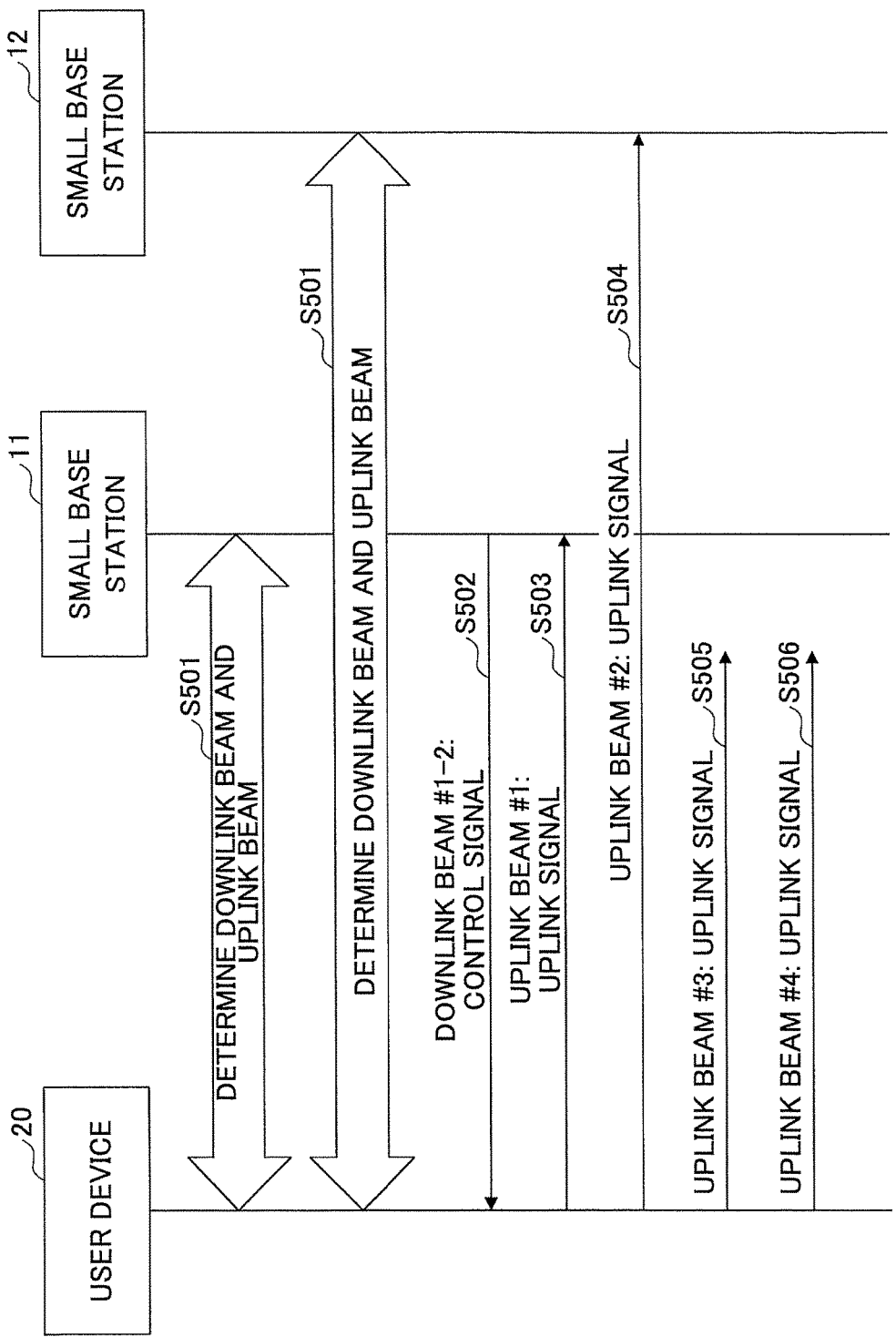
FIG. 13 is an example of a sequence chart illustrating the uplink signal transmission process (3)

FIG. 13 is an example of a sequence chart illustrating the uplink signal transmission process (3). Details of the uplink signal transmission process (3) are described below with reference to FIG. 13.

At step S501, downlink beams used for transmission of downlink signals and uplink beams used for transmission of uplink signals are determined between the small base stations 11 and 12 and the user device 20. Step S501 is substantially the same as step S301, and therefore the description of step S501 is omitted here. Here, a part of step S501 may be omitted. For example, the determination of uplink beams used for transmission of uplink signals may be omitted in such a case that the user device 20 is configured to transmit the same uplink signal using the uplink beams #1 through #4 and it is not necessary to predetermine which one of the uplink beams #1 through #4 is used for communication with each of the small base stations 11 and 12.

At step S502, the signal transmitter 102 of the small base station 11 transmits a control signal to the user device 20. The control signal may be, for example, an UL grant to be transmitted via a physical layer control channel (e.g., PDCCH).

Figure 14:
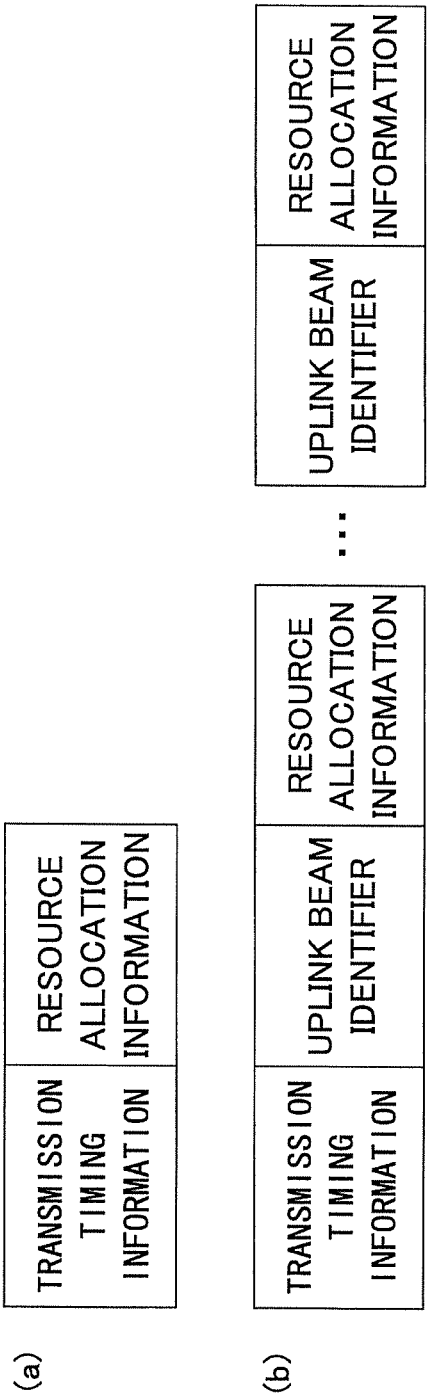
FIG. 14 is a drawing illustrating exemplary formats of a control signal used in the uplink signal transmission process (3)

FIG. 14 is a drawing illustrating exemplary formats of a control signal used in the uplink signal transmission process (3). In the uplink signal transmission process (3), two types of control signal formats may be used. A control signal format of FIG. 14 (*a*) contains one set of transmission timing information and one set of resource allocation information. The control signal format of FIG. 14 (*a*) may be used, for example, when the user device 20 transmits uplink signals containing the same information through the uplink beams #1 through #4. In a control signal format of FIG. 14 (*b*), one set of transmission timing information is contained at the beginning and multiple combinations of an uplink beam identifier and resource allocation information are contained after the transmission timing information. The control signal format of FIG. 12 (*b*) may be used, for example, when the user device 20 transmits uplink signals containing different sets of information by using orthogonal resources through the uplink beams #1 through #4. The resource allocation information may be generated by the uplink resource allocator 105 of the small base station 11, and the transmission timing information may be generated by the uplink transmission timing sender 104 of the small base station 11.

Referring back to FIG. 13, at step S503, the signal transmitter 202 and the transmission timing controller 212 of the user device 20 transmit an uplink signal using the uplink beam #1 at the transmission timing indicated by the control signal received at step S502. The uplink signal may be, for example, but not limited to, a physical uplink control channel (PUCCH), a sounding reference signal (SRS), or a physical random access channel (PRACH). A PRACH signal is normally used when the user device 20 initially starts uplink communication. However, a PRACH signal may be transmitted in this transmission process. Similarly, at each of steps S504 through S506, the signal transmitter 202 and the transmission timing controller 212 of the user device 20 transmit an uplink signal using one of the uplink beams #2 through #4 at the transmission timing indicated by the control signal received at step S502.

The uplink signal transmission process (3) described above may be applied to the transmission of an uplink physical channel that is preferably transmitted with comparatively-low directivity. This makes it possible to reduce the processing load of the user device 20.

(Downlink Signal Transmission Processes)

Next, processes performed in the radio communication system of the present embodiment to control downlink signals transmitted from the small base stations 11 and 12 to the user device 20 are described. Various types of processes for controlling downlink signals may be obtained by combining methods for synchronizing the reception timings of multiple downlink signals at the user device 20 and methods for allocating radio resources to downlink signals.

Figure 15:
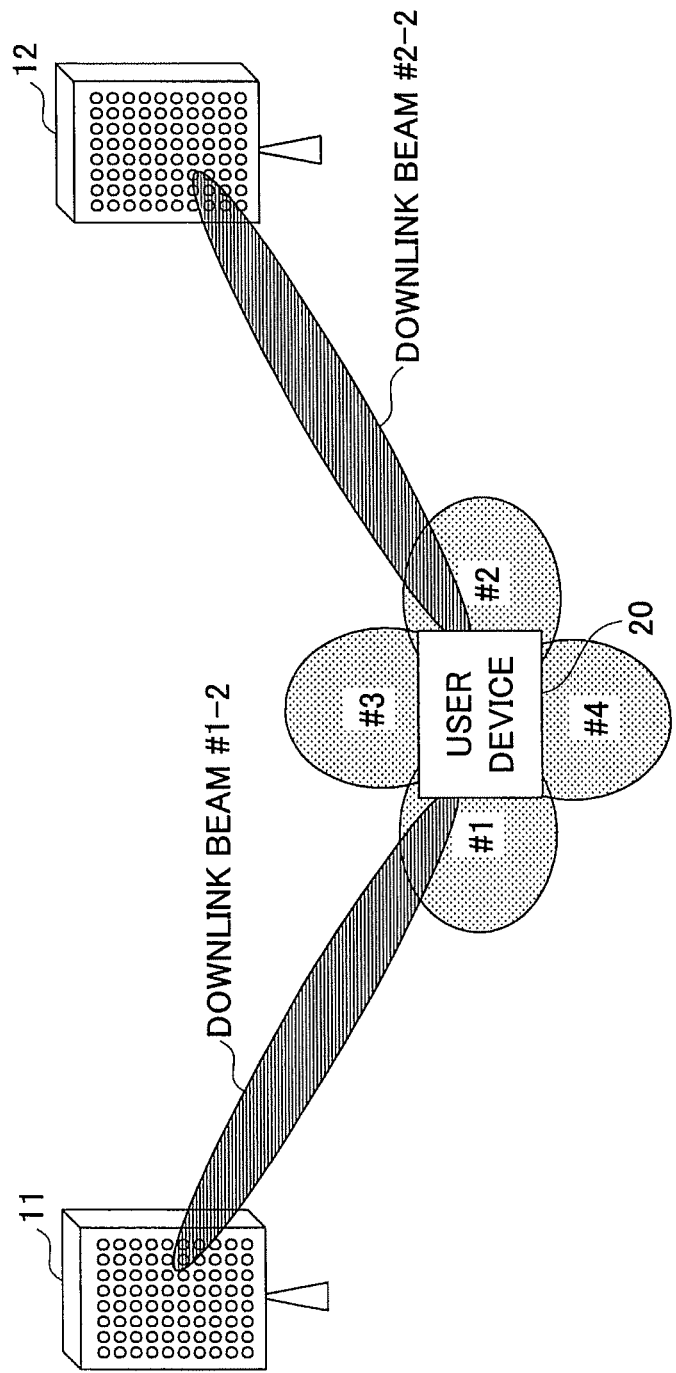
FIG. 15 is a drawing used to describe downlink signal synchronization methods performed by a user device.

FIG. 15 is a drawing used to describe downlink signal synchronization methods performed by a user device. First, methods for synchronizing the reception timings of multiple downlink signals at the user device are described with reference to FIG. 15. As illustrated in FIG. 15, the small base station 11 transmits a downlink signal to the user device 20 using the downlink beam #1-2, and the small base station 12 transmits a downlink signal to the user device 20 using the downlink beam #2-2.

Three types of downlink signal synchronization methods may be employed by the user device 20. In a first method, the user device 20 processes multiple downlink signals without synchronizing the reception timing separately with each of the downlink signals. At the user device 20, the reception timing of a downlink signal transmitted from the small base station 11 and the reception timing of a downlink signal transmitted from the small base station 12 may differ from each other due to different propagation delays. Accordingly, when the user device 20 synchronizes the reception timing with one of the downlink signals, a synchronization error in the reception timing may occur for the other one of the downlink signals. However, when the distance between the small base stations is small, the synchronization error may be ignorable. Therefore, to reduce the processing load of the user device 20, the first method where the reception timing is not synchronized separately with each of downlink signals may be employed. Here, synchronizing the reception timing indicates, for example, achieving OFDM symbol synchronization and frame synchronization.

In a second method, the user device 20 processes multiple downlink signals by synchronizing the reception timing separately with each of the downlink signals. In a third method, the user device 20 sends an instruction indicating the transmission timing separately to each of the small base stations 11 and 12. That is, in the third method, the timing advance control used in the current LTE standard is applied to downlink signals.

Figure 16:
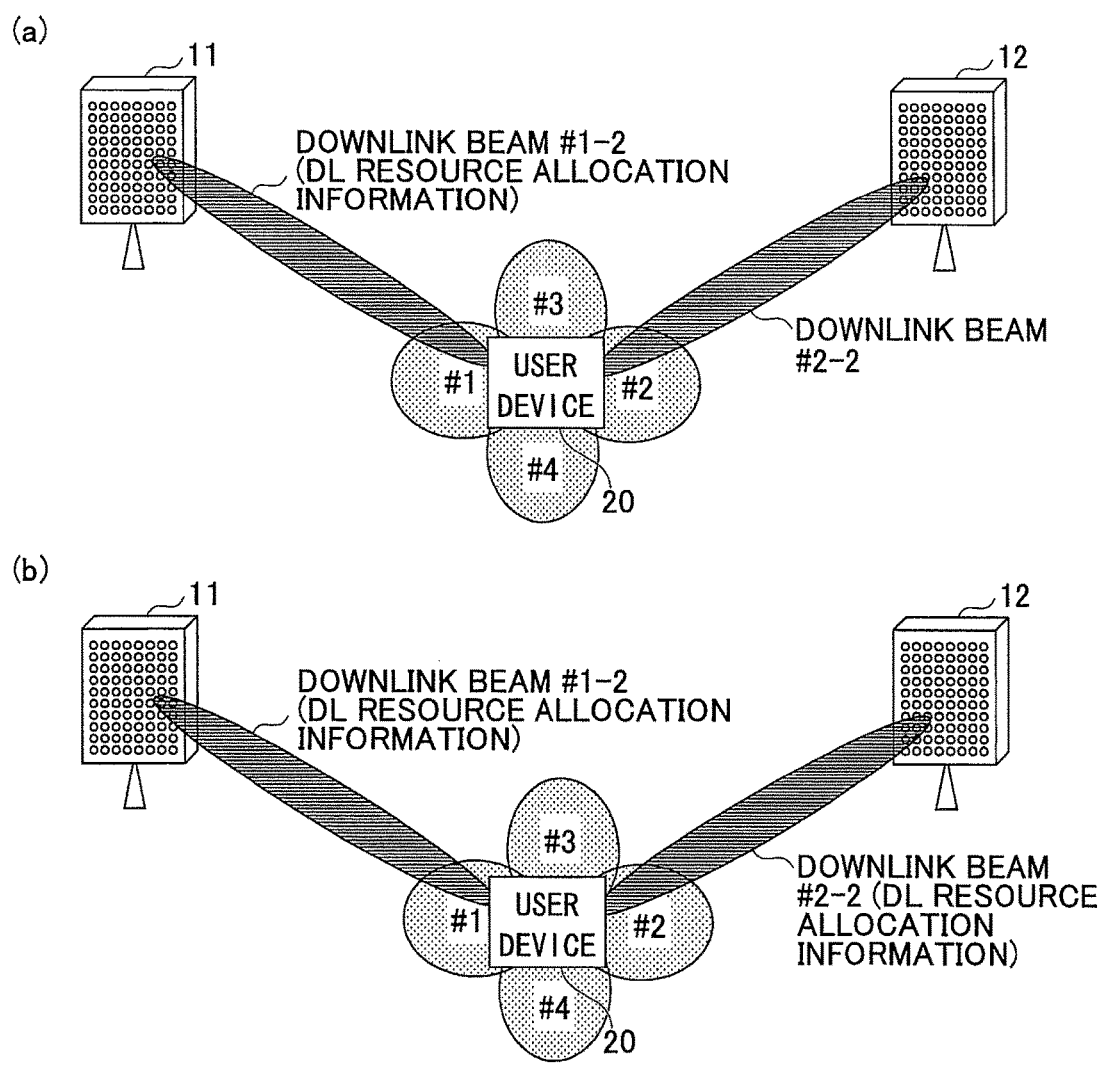
FIG. 16 is a drawing used to describe methods for allocating radio resources to downlink signals.

FIG. 16 is a drawing used to describe methods for allocating radio resources to downlink signals. Methods for allocating radio resources to downlink signals are described with reference to FIG. 16. In a method illustrated by FIG. 16 (*a*), the small base station 11 transmits allocation information indicating the allocation of radio resources for downlink signals transmitted from the small base stations 11 and 12 to the user device 20 by using the downlink beam #1-2 and the downlink beam #2-2. In a method illustrated by FIG. 16 (*b*), the small base station 11 transmits allocation information indicating the allocation of radio resources for a downlink signal transmitted from the small base station 11 to the user device 20 by using the downlink beam #1-2, and the small base station 12 transmits allocation information indicating the allocation of radio resources for a downlink signal transmitted from the small base station 12 to the user device 20 by using the downlink beam #2-2.

Several downlink signal transmission processes obtained by combining the above synchronization methods and the above radio resource allocation methods are described below. A downlink signal transmission process (1) is described with reference to FIGS. 17 through 19, a downlink signal transmission process (2) is described with reference to FIGS. 20 and 21, and a downlink signal transmission process (3) is described with reference to FIGS. 22 through 25. Also, examples of guard periods set in subframes in a case where the third synchronization method is applied to TDD are described with reference to FIG. 25.

Downlink signal transmission processes based on combinations of the synchronization methods and the radio resource allocation methods other than those described below may also be used in the radio communication system of the present embodiment.

[Transmission Process (1)]

Figure 17:
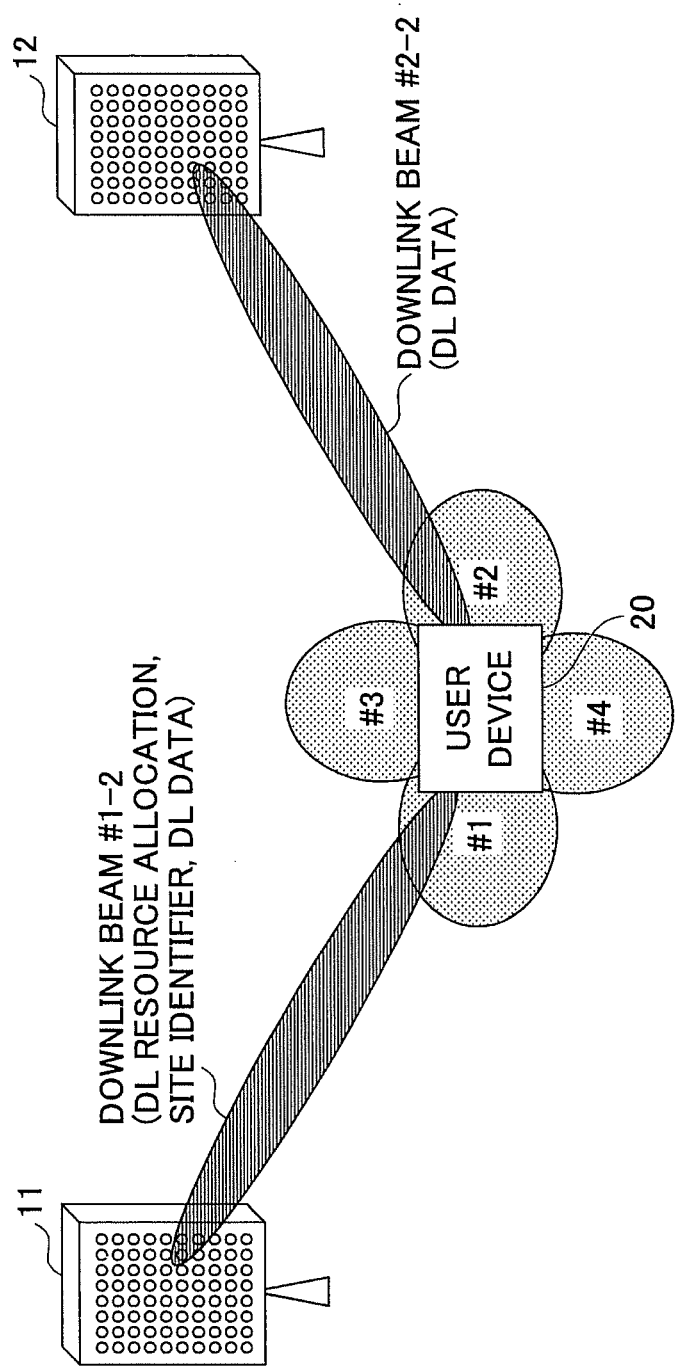
FIG. 17 is a drawing illustrating an outline of a downlink signal transmission process (1)

FIG. 17 is a drawing illustrating an outline of the downlink signal transmission process (1). As illustrated in FIG. 17, the small base station 11 transmits DL data and DL resource allocation information for the DL data to the user device 20 by using a downlink beam #1-2. Also, the small base station 12 transmits DL data to the user device 20 by using a downlink beam #2-2. In the example of FIG. 17, the user device 20 synchronizes the reception timing separately with each of a downlink signal transmitted using the downlink beam #1-2 and a downlink signal transmitted using the downlink beam #2-2, based on a site identifier described later.

Figure 18:
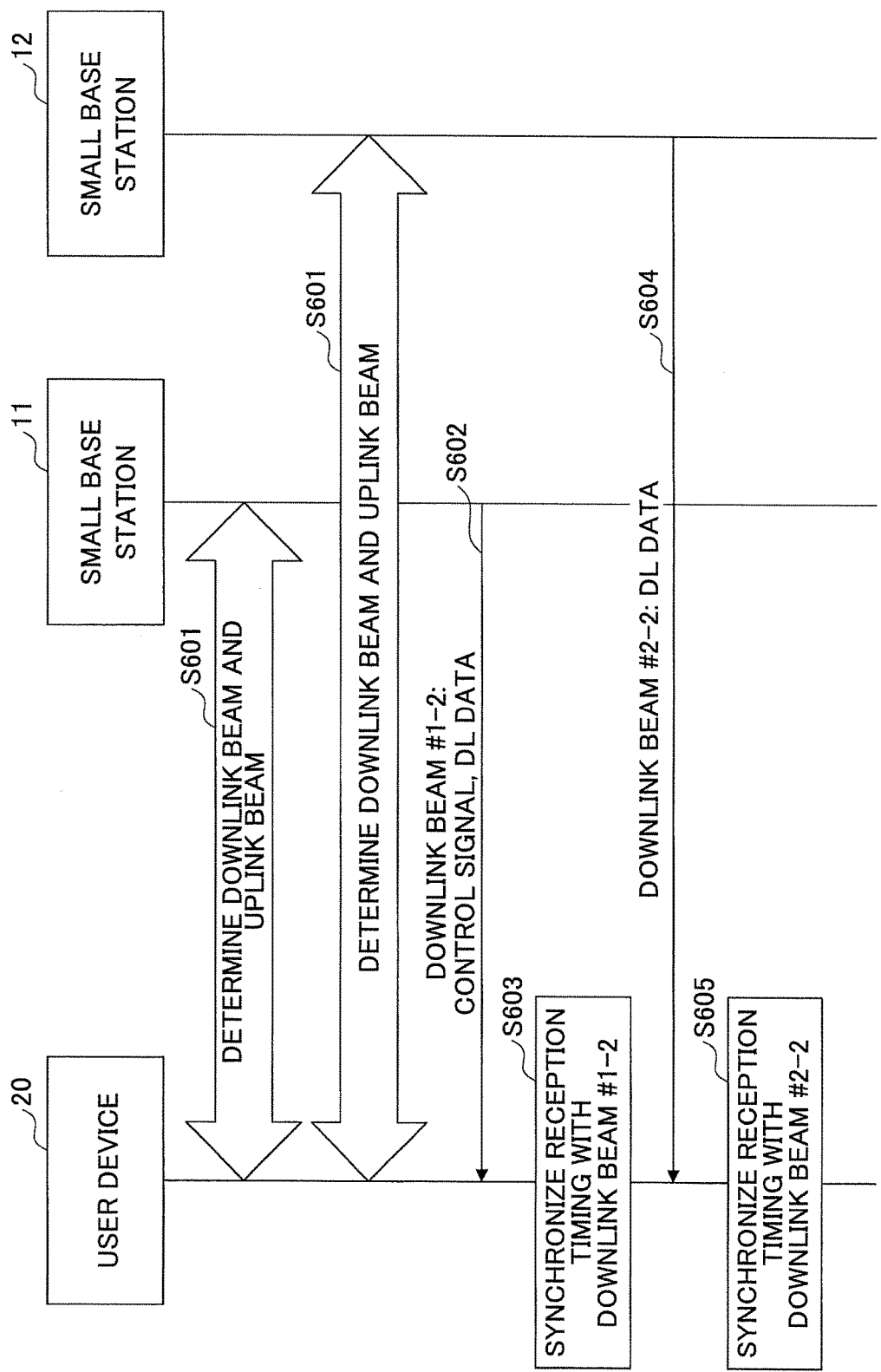
FIG. 18 is an example of a sequence chart illustrating the downlink signal transmission process (1)

FIG. 18 is an example of a sequence chart illustrating the downlink signal transmission process (1). Details of the downlink signal transmission process (1) are described below with reference to FIG. 18. In the example of FIG. 18, it is assumed that the small base station 11 centrally controls radio resources for small cells formed by the small base stations 11 and 12.

At step S601, downlink beams used for transmission of downlink signals and uplink beams used for transmission of uplink signals are determined between the small base stations 11 and 12 and the user device 20. Step S601 is substantially the same as step S301, and therefore the description of step S601 is omitted here.

At step S602, the signal transmitter 102 of the small base station 11 transmits a control signal and DL data to the user device 20 by using the downlink beam #1-2. The control signal includes resource allocation information indicating a location (e.g., a RB position) where the DL data is contained, and a site identifier indicating that two beams (beams #1-2 and #2-2) are transmitted from different small base stations. The site identifier may be information for uniquely identifying the small base stations 11 and 12, or information indicating the number of small base stations (in this example, "2") that is similar to the number of layers contained in DCI of PUCCH in the current LTE standard.

The site identifier included in the control signal may be mapped to, for example, DCI included in a physical layer control channel (PDCCH). Also, the entire control signal may be mapped to DCI. Also, the DL data may be included in, for example, a physical layer shared channel (PDSCH).

FIG. 19 is a drawing illustrating an exemplary format of a control signal used in the downlink signal transmission process (1). As illustrated by FIG. 19, "site identifier" and "resource allocation information" are contained in the control signal used in the downlink signal transmission process (1). The resource allocation information indicates radio resources allocated to DL data transmitted from the small base station 11 and the small base station 12, and may have a format similar to the format of resource allocation information used in the current LTE standard.

Referring back to FIG. 18, at step S603, the reception timing synchronizer 211 of the user device 20 determines that downlink signals are received from two different small base stations (11 and 12) based on the site identifier included in the control signal of the downlink signal received at step S602, and requests the signal receiver 201 to synchronize the reception timing with the downlink signal received from the small base station 11. Also, the signal receiver 201 obtains the DL data included in the downlink beam #1-2 based on the control signal.

At step S604, the signal transmitter 102 of the small base station 12 transmits DL data to the user device 20 by using the downlink beam #2-2. The DL data may be included in, for example, a physical layer shared channel (PDSCH).

At step S605, the reception timing synchronizer 211 of the user device 20 determines that downlink signals are received from two different small base stations (11 and 12) based on the site identifier included in the control signal of the downlink signal received at step S602, and requests the signal receiver 201 to synchronize the reception timing with the downlink signal received from the small base station 12. Also, the signal receiver 201 obtains the DL data included in the downlink beam #2-2 based on the control signal.

Although steps S602 through S605 are illustrated as if they are performed in sequence, steps S602 through S605 may be performed in parallel.

The downlink signal transmission process (1) is described above. For example, applying this transmission process to transmission of PDSCH makes it possible to achieve orthogonality in downlink and to increase the communication capacity of user data. In the transmission process (1), the control signal is transmitted only from the small base station 11. Accordingly, the transmission process (1) makes it possible to reduce the number of control signals transmitted and received between the small base stations 11 and 12 and the user device 20.

[Transmission Process (2)]

Next, the downlink signal transmission process (2) is described. Details of the downlink signal transmission process (2) not mentioned below may be the same as those of the downlink signal transmission process (1).

Figure 20:
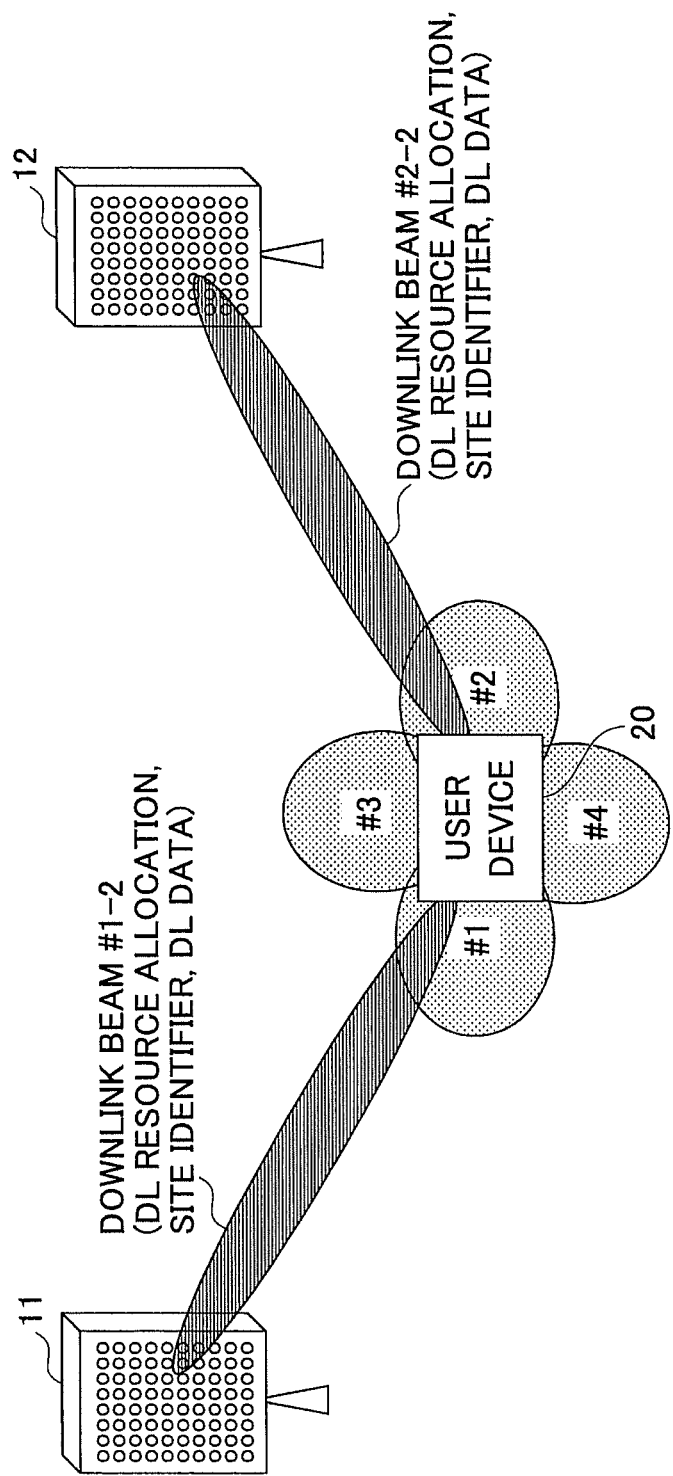
FIG. 20 is a drawing illustrating an outline of a downlink signal transmission process (2)

FIG. 20 is a drawing illustrating an outline of the downlink signal transmission process (2). As illustrated in FIG. 20, the small base station 11 transmits DL data and DL resource allocation information for the DL data to the user device 20 by using a downlink beam #1-2. Also, the small base station 12 transmits DL data and DL resource allocation information for the DL data to the user device 20 by using a downlink beam #2-2. Also, the user device 20 synchronizes the reception timing separately with each of a downlink signal transmitted using the downlink beam #1-2 and a downlink signal transmitted using the downlink beam #2-2, based on site identifiers.

Figure 21:
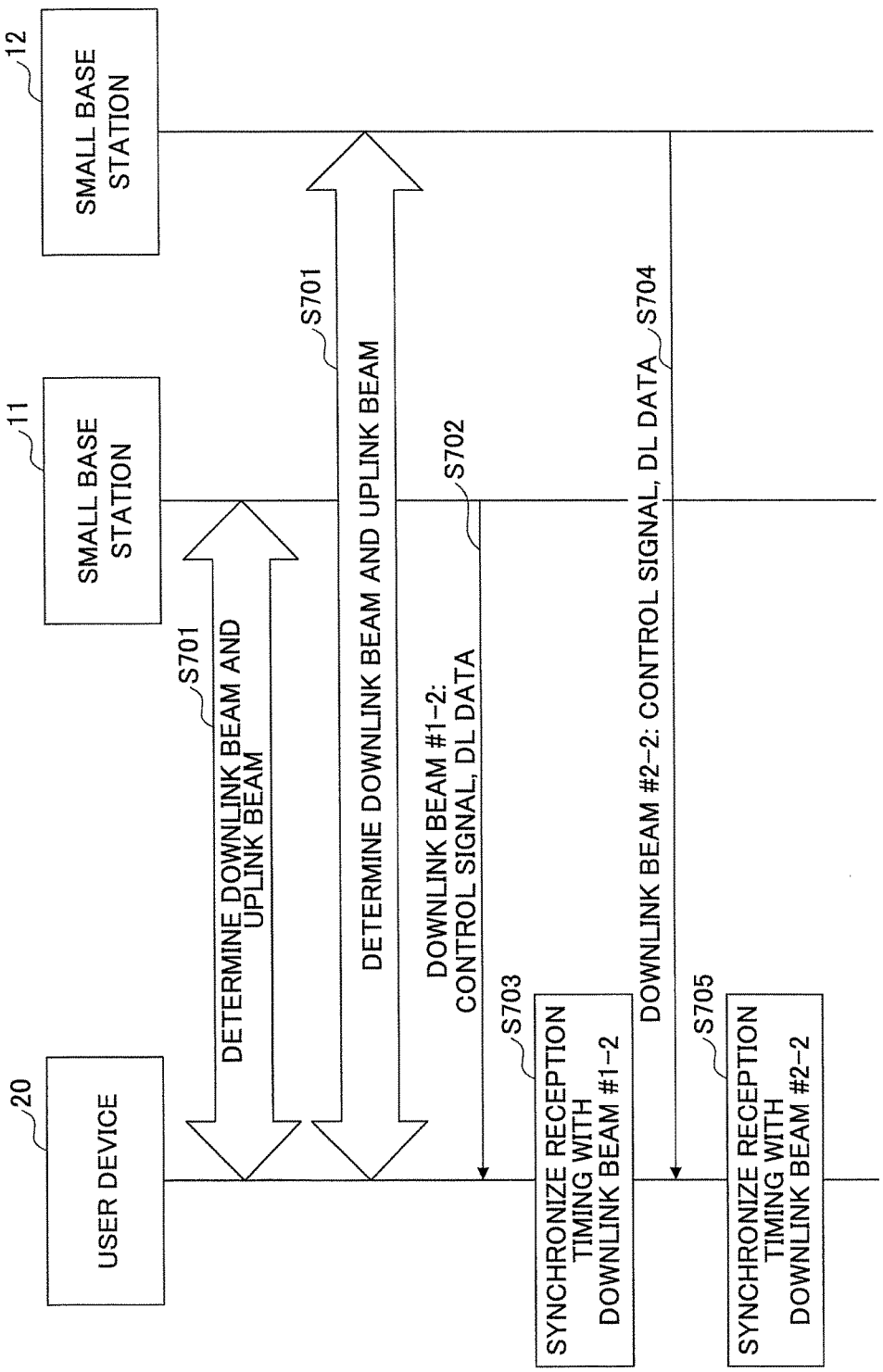
FIG. 21 is an example of a sequence chart illustrating the downlink signal transmission process (2)

FIG. 21 is an example of a sequence chart illustrating the downlink signal transmission process (2). Details of the downlink signal transmission process (2) are described below with reference to FIG. 21. At step S701, downlink beams used for transmission of downlink signals and uplink beams used for transmission of uplink signals are determined between the small base stations 11 and 12 and the user device 20. Step S701 is substantially the same as step S301, and therefore the description of step S701 is omitted here.

At step S702, the signal transmitter 102 of the small base station 11 transmits a control signal and DL data to the user device 20 by using the downlink beam #1-2. The control signal includes resource allocation information indicating a location (e.g., a RB position) where the DL data is contained, and a site identifier indicating that the beam #1-2 is transmitted from the small base station 11. The site identifier may be information for uniquely identifying the small base station 11/12. Also, the site identifier may be any other type of information that enables the user device 20 to distinguish between the small base stations 11 and 12.

The format of the control signal used in the downlink signal transmission process (2) is substantially the same as that illustrated by FIG. 19 and therefore its description is omitted here.

At step S703, the reception timing synchronizer 211 of the user device 20 determines that the downlink signal received at step S702 is transmitted from the small base station 11 based on the site identifier included in the control signal of the downlink signal, and requests the signal receiver 201 to synchronize the reception timing with the downlink signal. Also, the signal receiver 201 obtains the DL data included in the downlink beam #1-2 based on the control signal.

At step S704, the signal transmitter 102 of the small base station 12 transmits a control signal and DL data to the user device 20 by using the downlink beam #2-2. The DL data may be included in, for example, a physical layer shared channel (PDSCH).

The control signal includes resource allocation information indicating a location (e.g., an RB position) where the DL data is contained, and a site identifier indicating that the beam #2-2 is transmitted from the small base station 12. The site identifier may be information for uniquely identifying the small base station 11/12. Also, the site identifier may be any other type of information that enables the user device 20 to distinguish between the small base stations 11 and 12.

At step S705, the reception timing synchronizer 211 of the user device 20 determines that the downlink signal received at step S704 is transmitted from the small base station 12 based on the site identifier included in the control signal of the downlink signal, and requests the signal receiver 201 to synchronize the reception timing with the downlink signal received from the small base station 12. Also, the signal receiver 201 obtains the DL data included in the downlink beam #2-2 based on the control signal.

Although steps S702 through S705 are illustrated as if they are performed in sequence, steps S702 through S705 may be performed in parallel.

The downlink signal transmission process (2) is described above. For example, applying this transmission process to transmission of PDSCH makes it possible to achieve orthogonality in downlink and to increase the communication capacity of user data.

[Transmission Process (3)]

Figure 22:
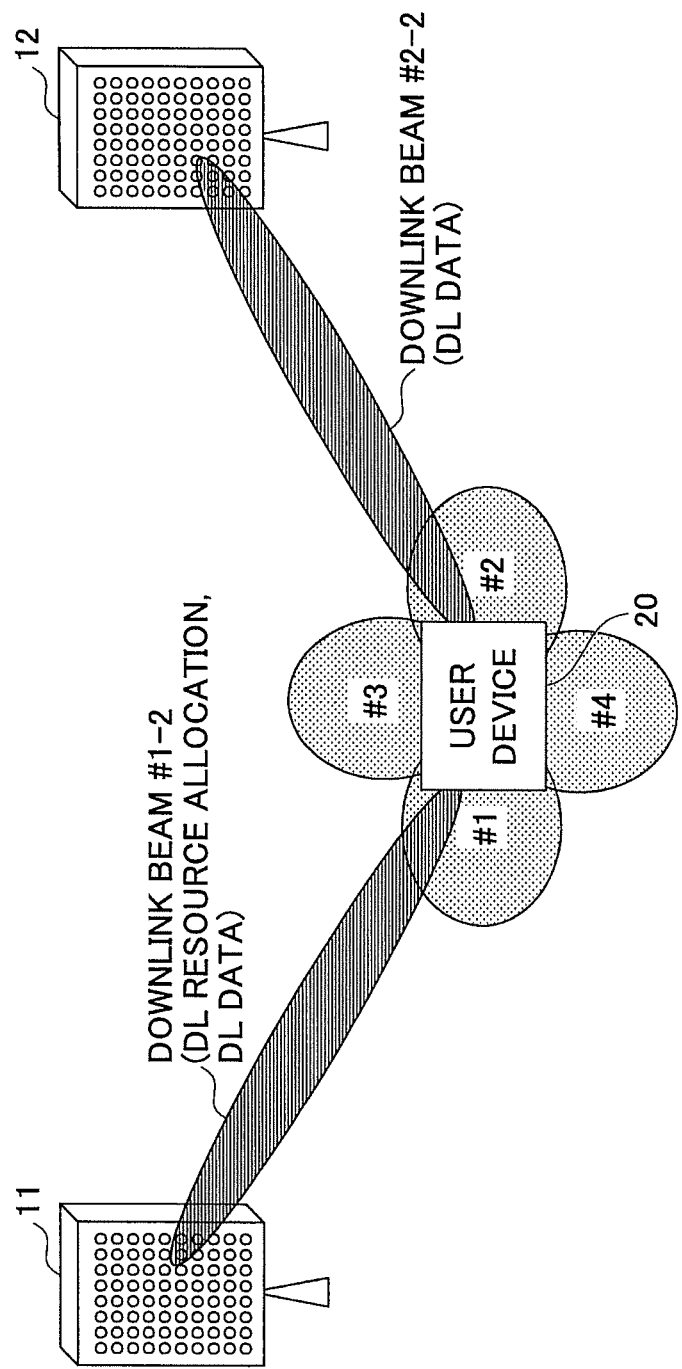
FIG. 22 is a drawing illustrating an outline of a downlink signal transmission process (3)

FIG. 22 is a drawing illustrating an outline of the downlink signal transmission process (3). As illustrated in FIG. 22, the small base station 11 transmits DL data and DL resource allocation information for the DL data to the user device 20 by using a downlink beam #1-2. Also, the small base station 12 transmits DL data to the user device 20 by using a downlink beam #2-2. In the example of FIG. 22, the user device 20 synchronizes the reception timing with a downlink signal transmitted using the downlink beam #1-2.

That is, instead of synchronizing the reception timing with each of multiple downlink beams as in the downlink signal transmission process (1), the user device 20 synchronizes the reception timing with one of the downlink beams.

Figure 23:
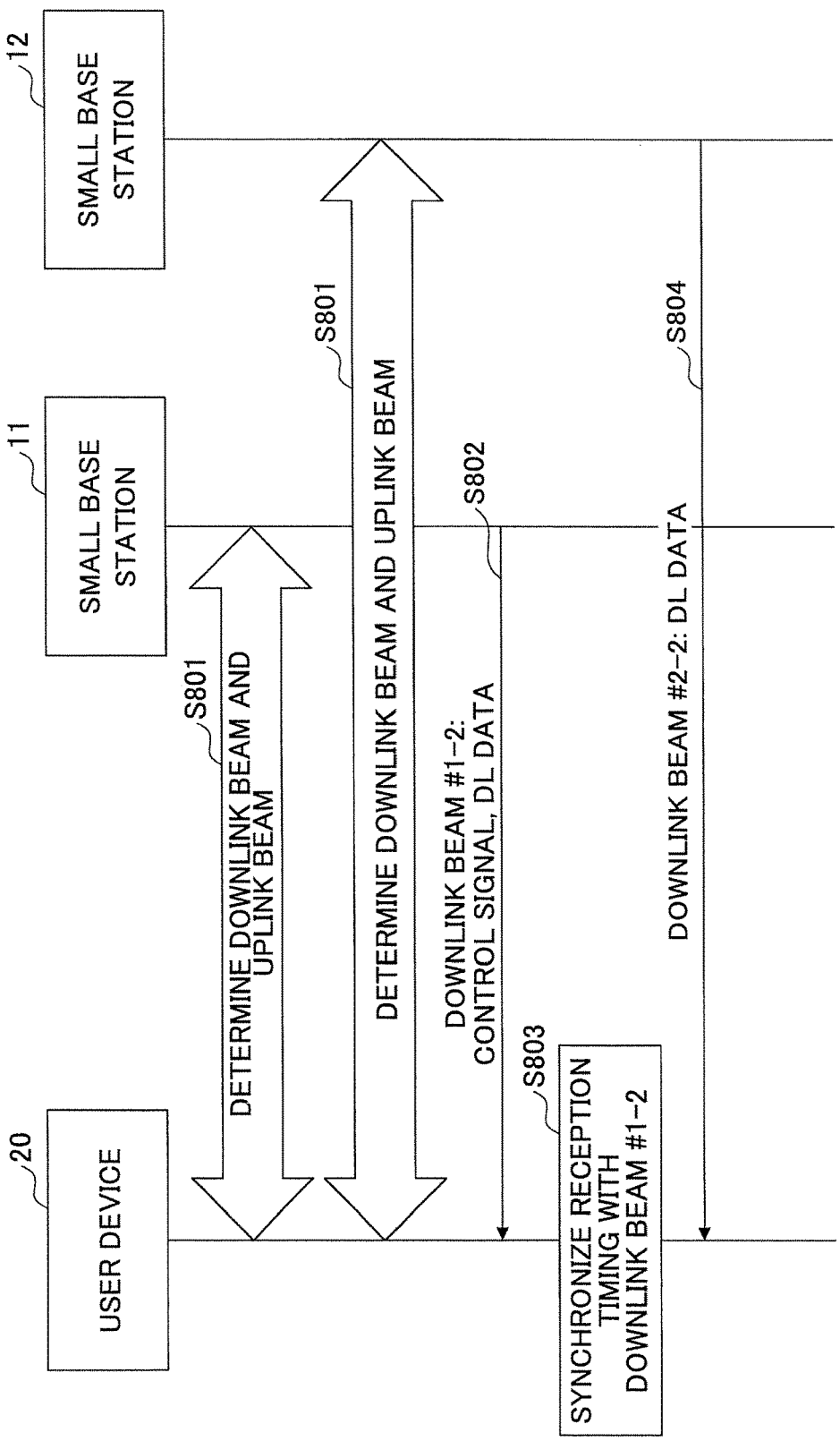
FIG. 23 is an example of a sequence chart illustrating the downlink signal transmission process (3)

FIG. 23 is an example of a sequence chart illustrating the downlink signal transmission process (3). Details of the downlink signal transmission process (3) are described below with reference to FIG. 23.

At step S801, downlink beams used for transmission of downlink signals and uplink beams used for transmission of uplink signals are determined between the small base stations 11 and 12 and the user device 20. Step S801 is substantially the same as step S301, and therefore the description of step S801 is omitted here.

At step S802, the signal transmitter 102 of the small base station 11 transmits a control signal and DL data to the user device 20 by using the downlink beam #1-2. The control signal includes resource allocation information indicating a location (e.g., a RB position) where the DL data is contained.

Figure 24:
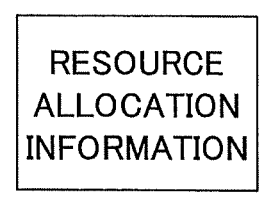

FIG. 24 is a drawing illustrating an exemplary format of a control signal used in the downlink signal transmission process (3). As illustrated by FIG. 24, "resource allocation information" is contained in the control signal used in the downlink signal transmission process (3).

Referring back to FIG. 23, at step S803, the reception timing synchronizer 211 of the user device 20 requests the signal receiver 201 to synchronize the reception timing with the downlink signal received at step S802. Also, the signal receiver 201 obtains the DL data included in the downlink beam #1-2 based on the control signal.

At step S804, the signal transmitter 102 of the small base station 12 transmits DL data to the user device 20 by using the downlink beam #2-2. The signal receiver 201 of the user device 20 obtains the DL data included in the downlink beam #2-2 based on the control signal received at step S802.

Although steps S802 through S804 are illustrated as if they are performed in sequence, steps S802 through S804 may be performed in parallel.

The downlink signal transmission process (3) is described above. In the transmission process (3), instead of synchronizing the reception timing with each of multiple downlink beams, the user device 20 synchronizes the reception timing with one of the downlink beams. This makes it possible to reduce the processing load of the user device 20. On the other hand, with the transmission process (3), a synchronization error may occur between multiple downlink beams. Therefore, from the standpoint of the user device 20, the transmission process (3) may be applied to a case where the difference between the reception timing of a downlink signal from the small base station 11 and the reception timing of a downlink signal from the small base station 12 is not large (i.e., in a case where the difference in propagation delay is not large).

Also, the transmission process (3) may be applied to transmission of some downlink signals such as a type of a control signal (e.g., a reference signal such as CSI-RS) for which the influence of a small synchronization error can be ignored.

[Examples of Guard Periods]

As described with reference to FIG. 15, in a downlink signal synchronization method (the third method), the user device 20 sends an instruction indicating the transmission timing separately to each of the small base stations 11 and 12. When applying this synchronization method to a communication system using TDD, it is necessary to set guard periods in subframes so that an uplink signal and a downlink signal do not overlap each other at the small base stations 11 and 12.

Figure 25:
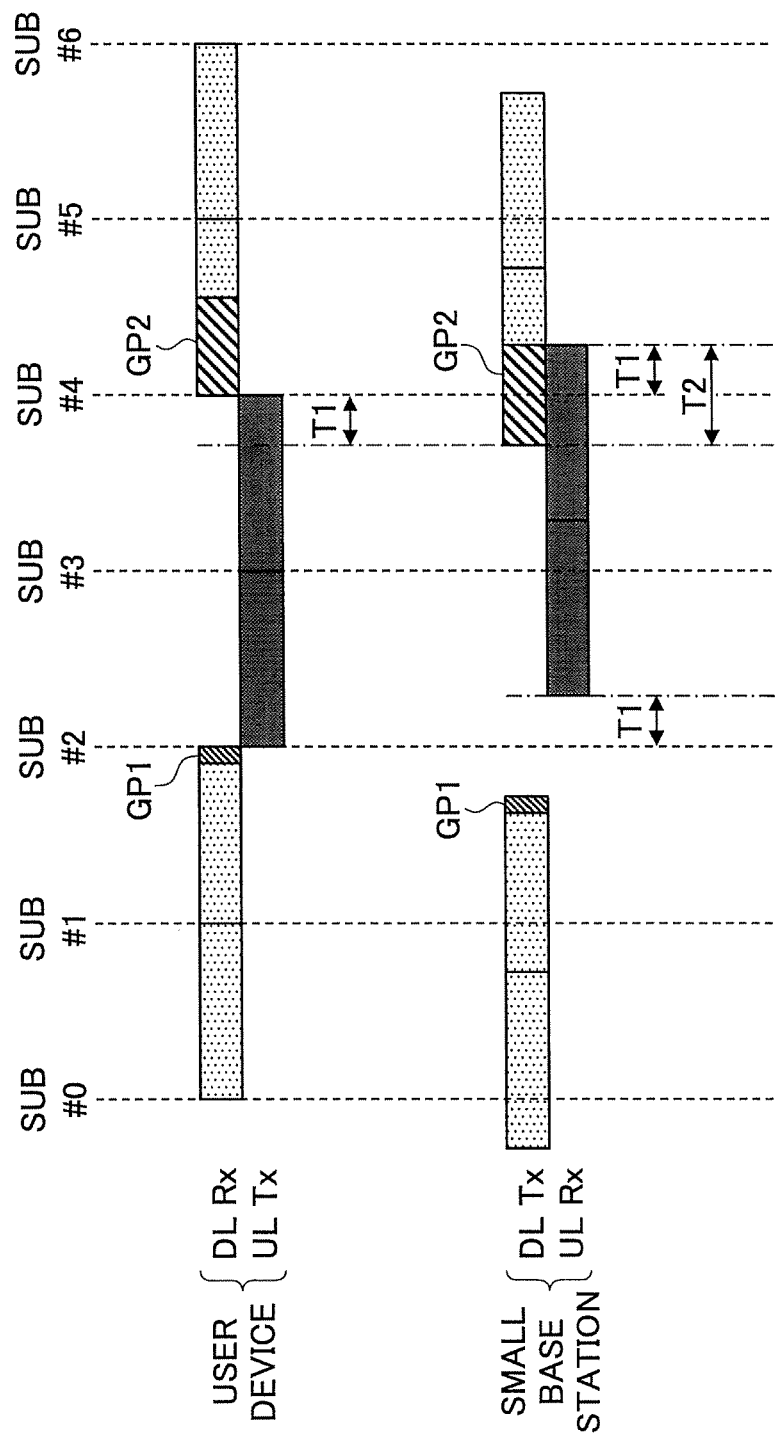
FIG. 25 is a drawing illustrating examples of guard periods.

FIG. 25 is a drawing illustrating examples of guard periods. In FIG. 25, Sub #0 through Sub #6 indicate subframe intervals recognized by the user device. Here, #0 through #6 are numerals used for the purpose of explanation. "DL (downlink) Rx" indicates a downlink signal received by the user device 20. "UL (uplink) Tx" indicates an uplink signal transmitted from the user device 20. "DL Tx" indicates a downlink signal transmitted from the small base station 11/12. "UL Rx" indicates an uplink signal received by the small base station 11/12. Thus, "DL Tx" and "DL Rx" correspond to each other and, similarly, "UL Tx" and "UL Rx" correspond to each other. Guard periods are set in the same manner regardless of whether the small base station or the small base station 12 communicates with the user device 20. In the descriptions below, the small base station 11 is used as an example.

As illustrated in FIG. 25, in the radio communication system of the present embodiment, among downlink signals (DL Tx) transmitted from the small base station 11, a guard period (GP1) is set in the last subframe before the downlink period changes to the uplink period. GP1 is, for example, a minimum time period necessary for the user device 20 to switch transmission and reception circuits.

Also, among downlink signals (DL Tx) transmitted from the small base station 11, a guard period (GP2) is set in the first subframe after the uplink period changes to the downlink period. GP2 is, for example, a time period that is two times greater than the maximum propagation delay time determined taking into account the cell design. The maximum propagation delay time determined taking into account the cell design may be variable as in the current LTE standard. That is, the maximum propagation delay time may be properly determined (or changed) according to, for example, the system operation of the operator.

A downlink signal (DL Tx) transmitted by the small base station 11 at Sub #4 reaches the user device after a propagation delay time (T1). That is, the small base station 11 needs to transmit the downlink signal (DL Tx) a time T1 earlier than the start time of the subframe (Sub #4) at the user device 20.

On the other hand, an uplink signal (UL Tx) transmitted by the user device 20 at Sub #2 reaches the small base station 11 after a propagation delay time (T1). As a result, at the small base station 11, the subframe of the uplink signal (UL Tx) of Sub #3 overlaps the subframe of the downlink signal (DL Tx) of Sub #4 by a time T2 (time T1×2). In TDD, the same frequency is used for downlink and uplink signals. Therefore, in a period where a downlink signal and an uplink signal overlap each other, only one of the downlink signal and the uplink signal can be transmitted or received. For this reason, in the example of FIG. 25, among downlink signals (DL Tx) transmitted from the small base station 11, the guard period (GP2) is set in the first subframe after the uplink period changes to the downlink period.

In the example of FIG. 25, the transmission timing requester 203 of the user device 20 transmits, via the signal transmitter 202, an instruction indicating the transmission timing of the downlink signal (DL Tx) to the small base station 11. The user device 20 may be configured to estimate a reception timing error based on, for example, a reference signal such as a channel state information-reference signal (CSI-RS) transmitted from each of the small base stations 11 and 12, and to transmit an instruction indicating the transmission timing (e.g., a timing adjustment command) to each of the small base stations 11 and 12.

<Effects>

As described above, an embodiment of the present invention provides a user device that communicates with base stations in a radio communication system including the base stations. The user device includes a receiver that receives a first downlink control signal transmitted from one of the base stations, a transmitter that transmits uplink signals using multiple antenna ports or multiple beams, and a controller that controls, for each subframe, transmission timing of the uplink signals transmitted using the multiple antenna ports or the multiple beams, based on the first downlink control signal.

The user device 20 provides a technology that enables efficient communication in a radio communication system including the user device 20 and the base station 10 that perform beam forming.

The receiver may be configured to also receive a second downlink control signal different from the first downlink control signal, and the controller may be configured to control, for each subframe, the transmission timing of the uplink signals transmitted using the multiple antenna ports or the multiple beams, based on the first downlink control signal and the second downlink control signal.

When uplink signals are transmitted using multiple uplink beams from this user device 20, the reception timings of the uplink signals at the first base station and the second base station are synchronized with each other. With this configuration, the radio communication system of the embodiment, for example, makes it possible to achieve orthogonality between uplink signals transmitted from the user device and another user device 20, and to increase the communication capacity of user data through MIMO spatial multiplexing that is realized by multiple uplink beams transmitted from the user device 20. Also, compared with the current LTE standard, the above configuration makes it possible to perform detailed transmission timing control for each subframe.

The first downlink control signal and the second downlink control signal may include identifiers for identifying the multiple beams, and the transmitter may be configured to transmit the uplink signals to the base stations using antenna ports or beams corresponding to the identifiers. With this configuration, the user device 20 can transmit uplink signals using antenna ports or beams specified by the first base station and the second base station.

Another embodiment of the present invention provides a base station that communicates with a user device in a mobile communication system including the base station, another base station, and the user device. The base station includes a receiver that receives an uplink signal transmitted from the user device, and a transmitter that transmits, for each subframe, a control signal including information reporting transmission timing of the uplink signal to the user device. The transmission timing is calculated based on the uplink signal or obtained from the another base station.

This base station 10 provides a technology that enables efficient communication in a radio communication system including a user device and base stations that perform beam forming.

Another embodiment of the present invention provides a user device that communicates with a first base station and a second base station in a radio communication system including the first base station and the second base station. The user device includes a receiver that receives a first downlink signal transmitted from the first base station and a second downlink signal transmitted from the second base station, and a synchronizer that controls the receiver to synchronize with the first downlink signal and the second downlink signal at different reception timings in each subframe.

This user device 20 provides a technology that enables efficient communication in a radio communication system including the user device 20 and the base station 10 that perform beam forming.

The receiver may be configured to receive a first control signal that is transmitted from the first base station and includes an identifier indicating that the first downlink signal is transmitted from the first base station and an identifier indicating that the second downlink signal is transmitted from the second base station, and the synchronizer may be configured to control the receiver based on the first control signal. Also, the receiver may be configured to receive a first control signal that is transmitted from the first base station and includes an identifier indicating that the first downlink signal is transmitted from the first base station, and a second control signal that is transmitted from the second base station and includes an identifier indicating that the second downlink signal is transmitted from the second base station; and the synchronizer may be configured to control the receiver based on the first control signal and the second control signal.

This user device 20 makes it possible to achieve orthogonality between downlink signals transmitted separately from the first base station and the second base station, and to increase the communication capacity of user data.

Another embodiment of the present invention provides a user device that communicates with a first base station and a second base station in a radio communication system including the first base station and the second base station. The user device includes a receiver that receives a first downlink signal transmitted from the first base station and a second downlink signal transmitted from the second base station, and a transmitter that transmits signals for requesting the first base station and the second base station to change transmission timing so that the reception timing of the first downlink signal and the reception timing of the second downlink signal synchronize with each other.

This user device 20 provides a technology that enables efficient communication in a radio communication system including the user device 20 and the base station 10 that perform beam forming.

Components in the user device and the base station described above may also be referred to as "units", "parts", "circuits", or "devices".

Supplementary Description of Embodiments

Embodiments of the present invention are described above. However, the present invention is not limited to the above-described embodiments, and a person skilled in the art may understand that variations, modifications, and replacements may be made to the above embodiments. Although specific values are used in the above descriptions to facilitate the understanding of the present invention, the values are just examples and other appropriate values may also be used unless otherwise mentioned. Grouping of subject matter in the above descriptions is not essential for the present invention. For example, subject matter described in two or more sections may be combined as necessary, and subject matter described in one section may be applied to subject matter described in another section unless they contradict each other. Boundaries of functional units or processing units in functional block diagrams do not necessarily correspond to boundaries of physical components. Operations of multiple functional units may be performed by one physical component, and an operation of one functional unit may be performed by multiple physical components. Although a functional block diagram is used to describe a user device and a base station, the user device and the base station may be implemented by hardware, software, or a combination of them. Software to be executed by a processor of a user device and software to be executed by a processor of a base station according to the embodiments of the present invention may be stored in any appropriate storage medium such as a random access memory (RAM), a flash memory, a read-only memory (ROM), an EPROM, an EEPROM, a register, a hard disk drive (HDD), a removable disk, a CD-ROM, a database, or a server. The present invention is not limited to the specifically disclosed embodiments, and variations and modifications may be made without departing from the scope of the present invention.

In the above embodiments, an UL grant is an example of each of a first downlink control signal, a second downlink control signal, and a control signal. DCI is an example of a first control signal and a second control signal. The signal receiver 101 and the signal receiver 201 are examples of receivers. The signal transmitter 102 and the signal transmitter 202 are examples of transmitters. The transmission timing controller 212 is an example of a controller. The reception timing synchronizer 211 is an example of a synchronizer.

The present application is based on and claims the benefit of priority of Japanese Patent Application No. 2015-058738 filed on Mar. 20, 2015, the entire contents of which are hereby incorporated herein by reference.

EXPLANATION OF REFERENCE NUMERALS

10 Macro base station
11 Small base station
12 Small base station
20 User device
22 Small base station
101 Signal receiver
102 Signal transmitter
103 Inter-base-station communicator
104 Uplink transmission timing sender
105 Uplink resource allocator
106 Downlink resource allocator
201 Signal receiver
202 Signal transmitter
203 Transmission timing requester
211 Reception timing synchronizer
212 Transmission timing controller
301 RF module
302 BB processing module
303 Device control module
304 Communication IF
401 RF module
402 BB processing module
403 UE control module

The invention claimed is:

1. A user device communicating with base stations in a radio communication system including the base stations, the user device comprising:
a receiver that receives a first downlink control signal transmitted from one of the base stations, and a second downlink control signal different from the first downlink control signal;
a transmitter that transmits uplink signals using multiple antenna ports or multiple beams; and
a controller that controls, for each subframe, transmission timing of the uplink signals transmitted using the multiple antenna ports or the multiple beams, based on the first downlink control signal and the second downlink control signal.

2. The user device as claimed in claim 1, wherein the first downlink control signal and the second downlink control signal are control signals used in a physical layer.

3. The user device as claimed in claim 1, wherein
the first downlink control signal and the second downlink control signal include identifiers for identifying the multiple beams; and
the transmitter transmits the uplink signals to the base stations using antenna ports or beams corresponding to the identifiers.

4. The user device as claimed in claim 3, wherein the first downlink control signal and the second downlink control signal are control signals used in a physical layer.

5. A base station communicating with a user device in a mobile communication system including the base station, another base station, and the user device, the base station comprising:
a receiver that receives an uplink signal transmitted from the user device; and
a transmitter that transmits, for each subframe, a control signal including information reporting transmission timing of the uplink signal to the user device, the transmission timing being calculated based on the uplink signal or obtained from the another base station.

6. A user device communicating with a first base station and a second base station in a radio communication system including the first base station and the second base station, the user device comprising:
a receiver that receives a first downlink signal transmitted from the first base station and a second downlink signal transmitted from the second base station; and
a synchronizer that controls the receiver to synchronize with the first downlink signal and the second downlink signal at different reception timings in each subframe.

7. The user device as claimed in claim 6, wherein
the receiver receives a first control signal that is transmitted from the first base station and includes an identifier indicating that the first downlink signal is transmitted from the first base station and an identifier indicating that the second downlink signal is transmitted from the second base station; and
the synchronizer controls the receiver based on the first control signal.

8. The user device as claimed in claim 7, wherein the first control signal is mapped to DCI transmitted via a physical channel.

9. The user device as claimed in claim 6, wherein
the receiver receives
a first control signal that is transmitted from the first base station and includes an identifier indicating that the first downlink signal is transmitted from the first base station, and
a second control signal that is transmitted from the second base station and includes an identifier indicating that the second downlink signal is transmitted from the second base station; and
the synchronizer controls the receiver based on the first control signal and the second control signal.

10. The user device as claimed in claim 9, wherein the first control signal is mapped to DCI transmitted via a physical channel.

11. A user device communicating with a first base station and a second base station in a radio communication system including the first base station and the second base station, the user device comprising:
a receiver that receives a first downlink signal transmitted from the first base station and a second downlink signal transmitted from the second base station; and
a transmitter that transmits signals for requesting the first base station and the second base station to change transmission timing so that the reception timing of the first downlink signal and the reception timing of the second downlink signal synchronize with each other.

* * * * *